(12) United States Patent
Togo et al.

(10) Patent No.: US 8,532,468 B2
(45) Date of Patent: Sep. 10, 2013

(54) MOVING IMAGE DATA EDITING APPARATUS, MOVING IMAGE DATA REPRODUCING APPARATUS, MOVING IMAGE DATA EDITING METHOD, AND MOVING IMAGE DATA REPRODUCING METHOD

(75) Inventors: Tsutomu Togo, Kawasaki (JP); Atsuko Tada, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1474 days.

(21) Appl. No.: 11/896,905

(22) Filed: Sep. 6, 2007

(65) Prior Publication Data

US 2008/0063378 A1    Mar. 13, 2008

Related U.S. Application Data

(63) Continuation of application No. PCT/JP2005/005013, filed on Mar. 18, 2005.

(51) Int. Cl.
*H04N 5/93* (2006.01)
*G11B 27/00* (2006.01)

(52) U.S. Cl.
USPC ......................................... 386/278; 386/280

(58) Field of Classification Search
USPC ......................................... 386/248, 278–290
See application file for complete search history.

(56) References Cited

U.S. PATENT DOCUMENTS

| 5,117,283 | A  | * | 5/1992  | Kroos et al. ............... 348/564 |
| 6,961,444 | B2 | * | 11/2005 | Levy ......................... 382/100 |
| 7,714,878 | B2 | * | 5/2010  | Gabay et al. ............... 345/626 |
| 2002/0197067 | A1 | * | 12/2002 | Ohnishi ..................... 386/120 |
| 2004/0247192 | A1 | * | 12/2004 | Kajiki et al. ............... 382/239 |
| 2005/0152677 | A1 | * | 7/2005  | Matsumoto .................. 386/69 |

FOREIGN PATENT DOCUMENTS

| JP | 64-36460     | 2/1989  |
| JP | 8-65572      | 3/1996  |
| JP | 11-41517     | 2/1998  |
| JP | 2003-116053  | 4/2003  |
| JP | 2003-198936  | 7/2003  |
| JP | 3552945      | 5/2004  |
| JP | 2007-274188  | 9/2004  |
| JP | 2004-357126  | 12/2004 |

* cited by examiner

*Primary Examiner* — Thai Tran
*Assistant Examiner* — Nigar Chowdhury
(74) *Attorney, Agent, or Firm* — Staas & Halsey LLP

(57) ABSTRACT

This invention is directed to the provision of a moving image data editing apparatus 1 for applying masking to a portion of an image by editing moving image data in which each frame is divided into pixel blocks of a predetermined size and encoded on a pixel block basis. Moving image data editing apparatus 1 comprises: pixel block extracting means 11 for extracting from an input data stream of moving image data 71 pixel blocks BL2 and BL4 that are located within the region 72 to which masking is to be applied; fixed pattern inserting means 12 for inserting precoded fixed pattern data 73 into the original positions of extracted pixel blocks BL2 and BL4 in the data stream; and pixel block inserting means 13 for inserting extracted pixel blocks BL2 and BL4 as user data into the data stream.

26 Claims, 20 Drawing Sheets

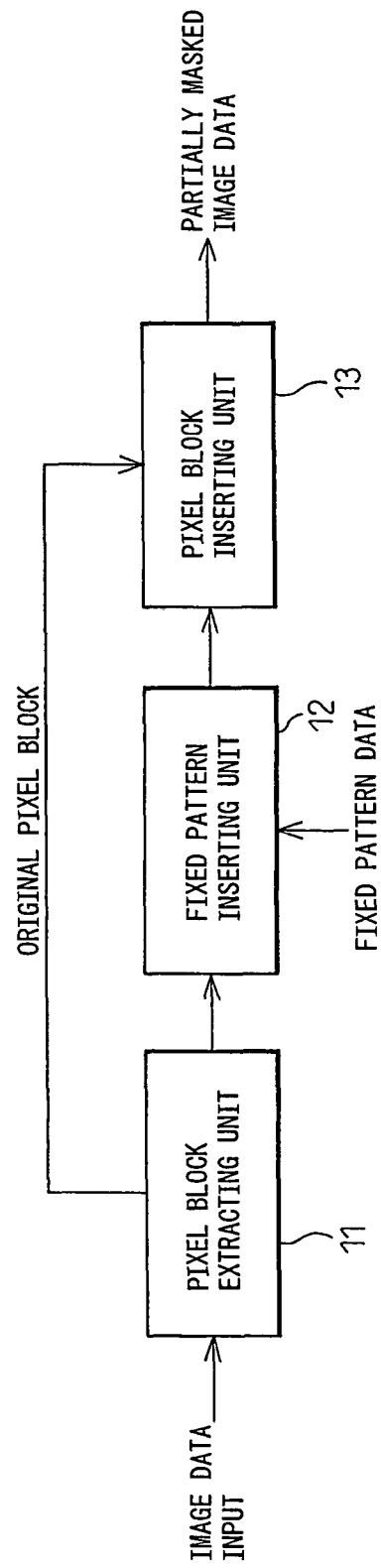

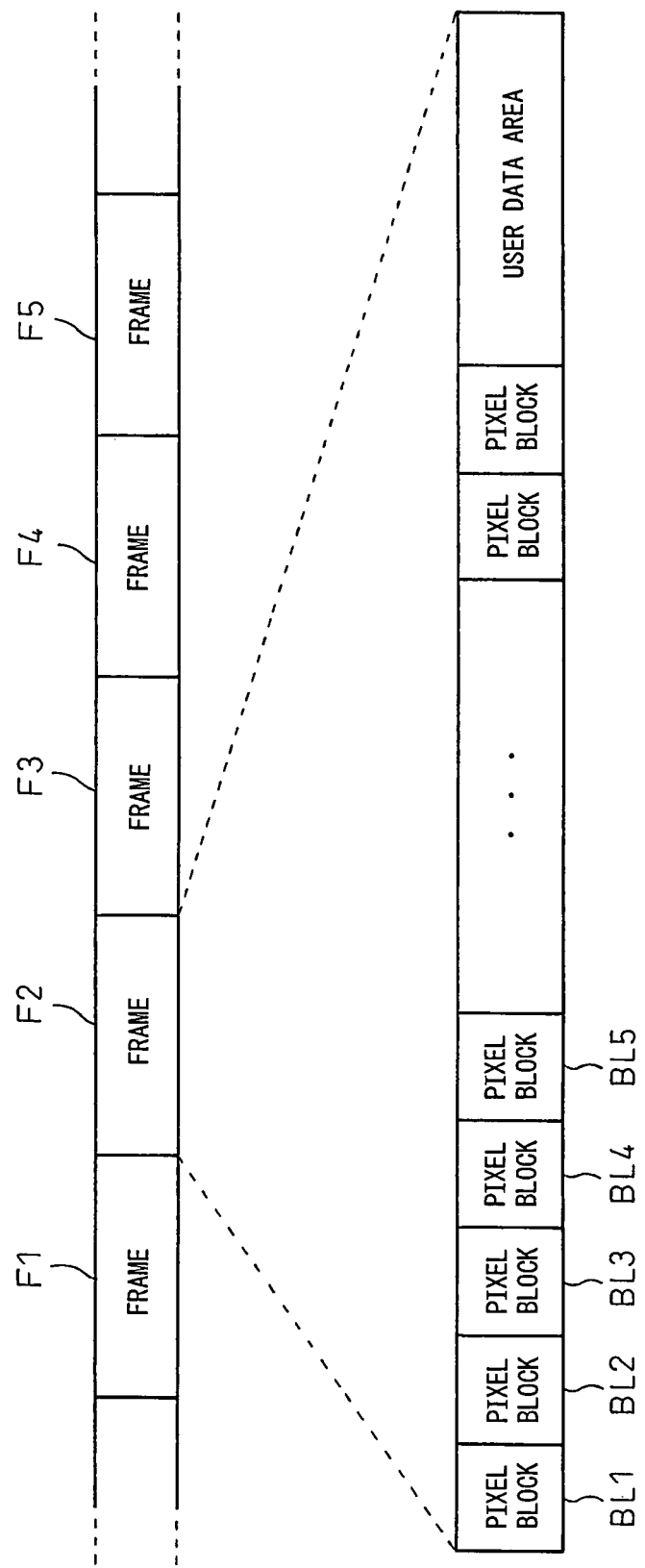

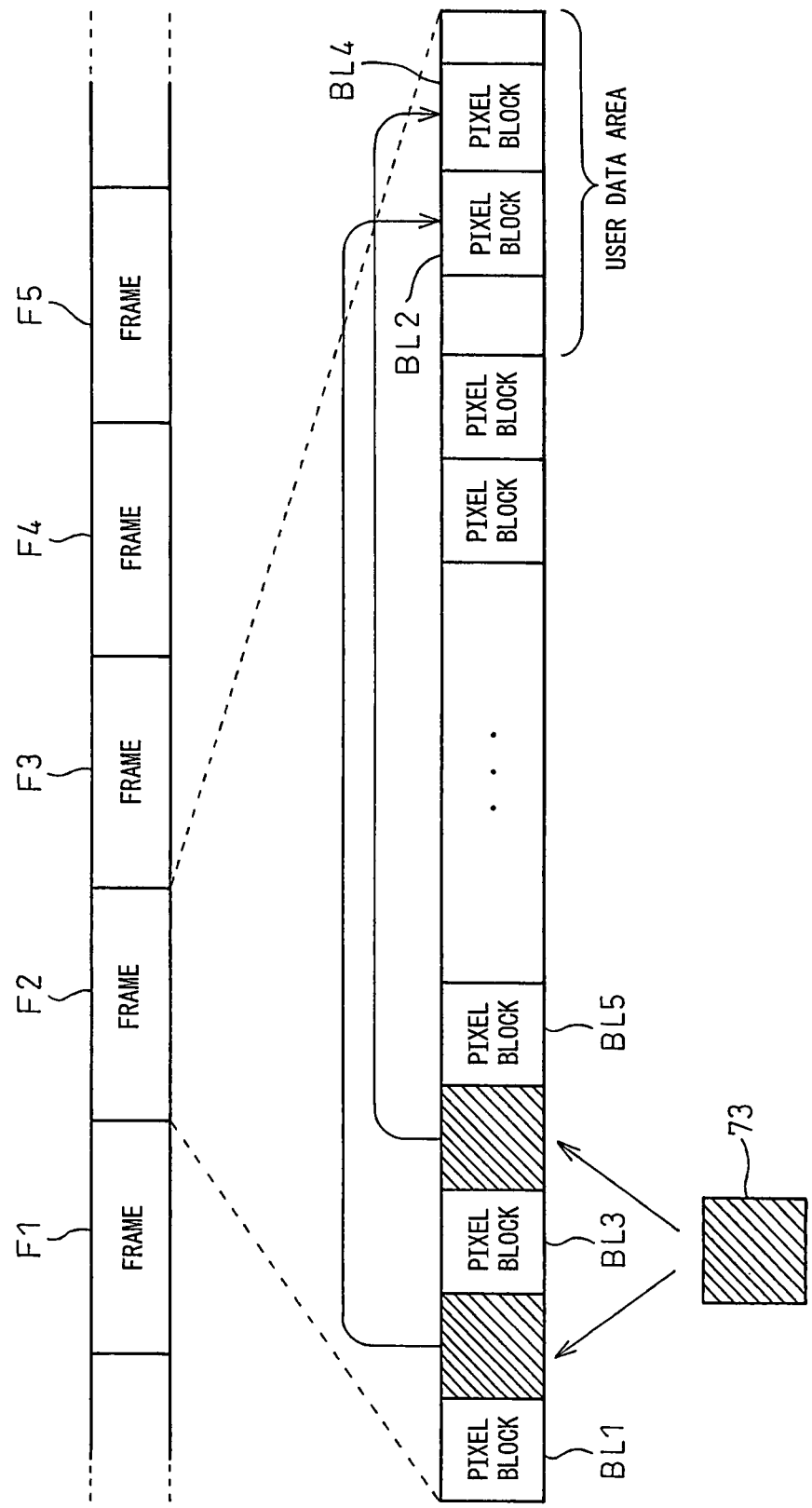

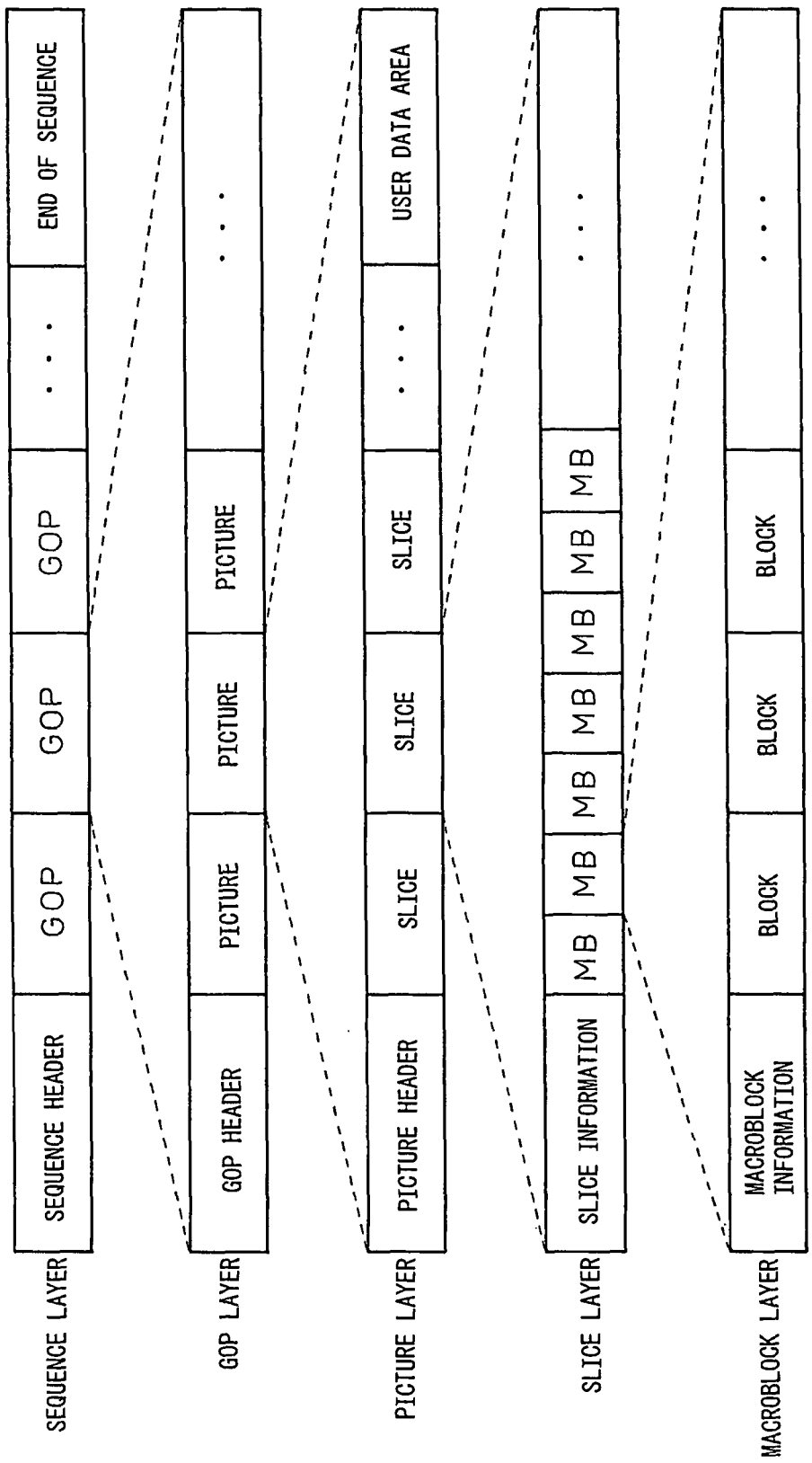

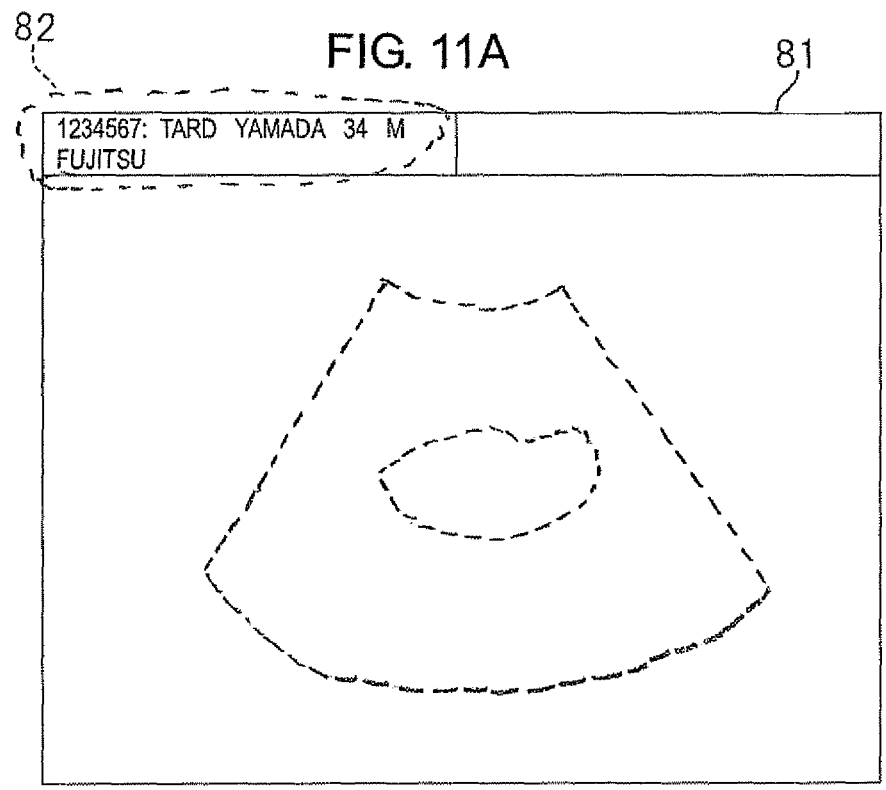

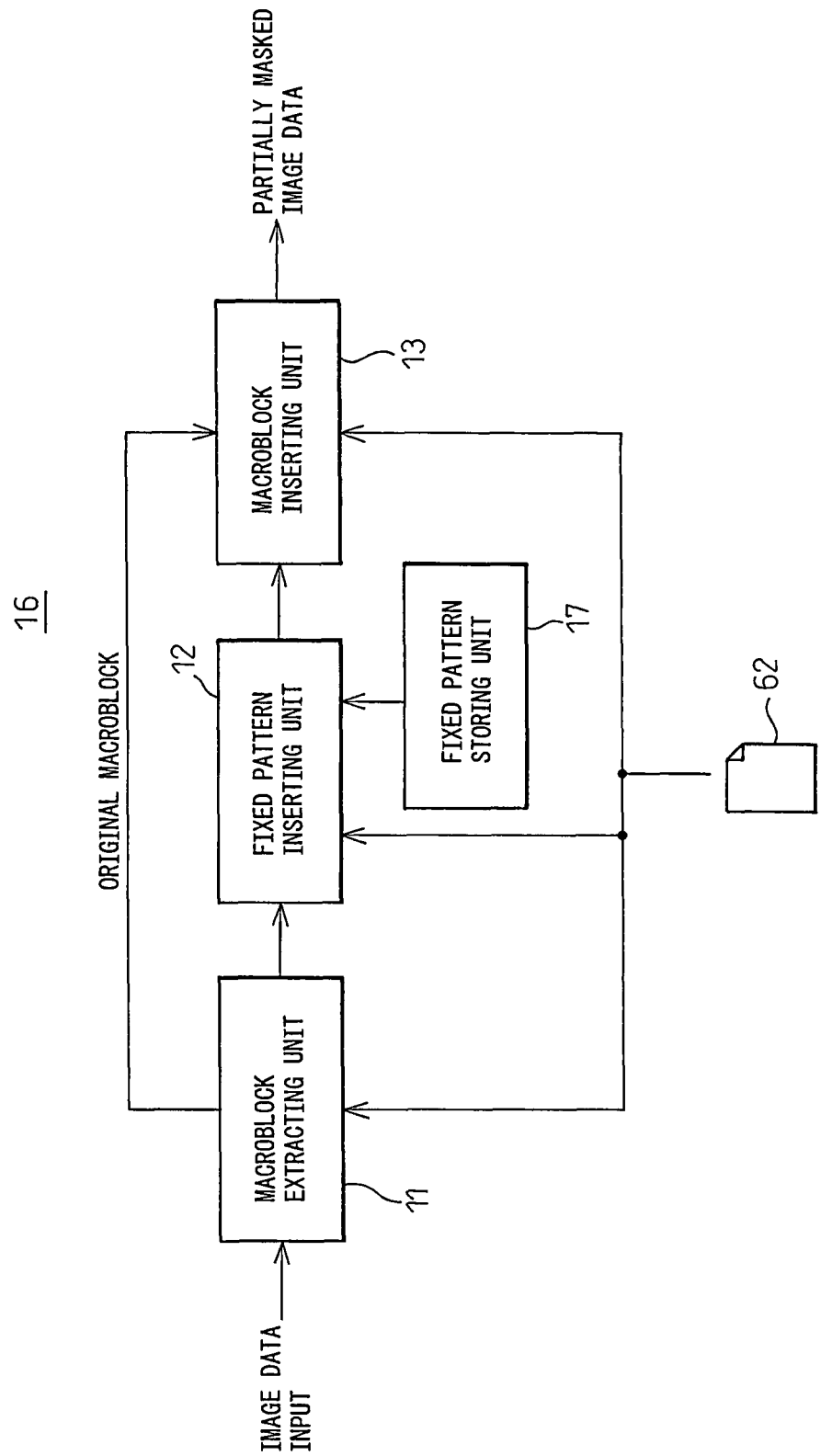

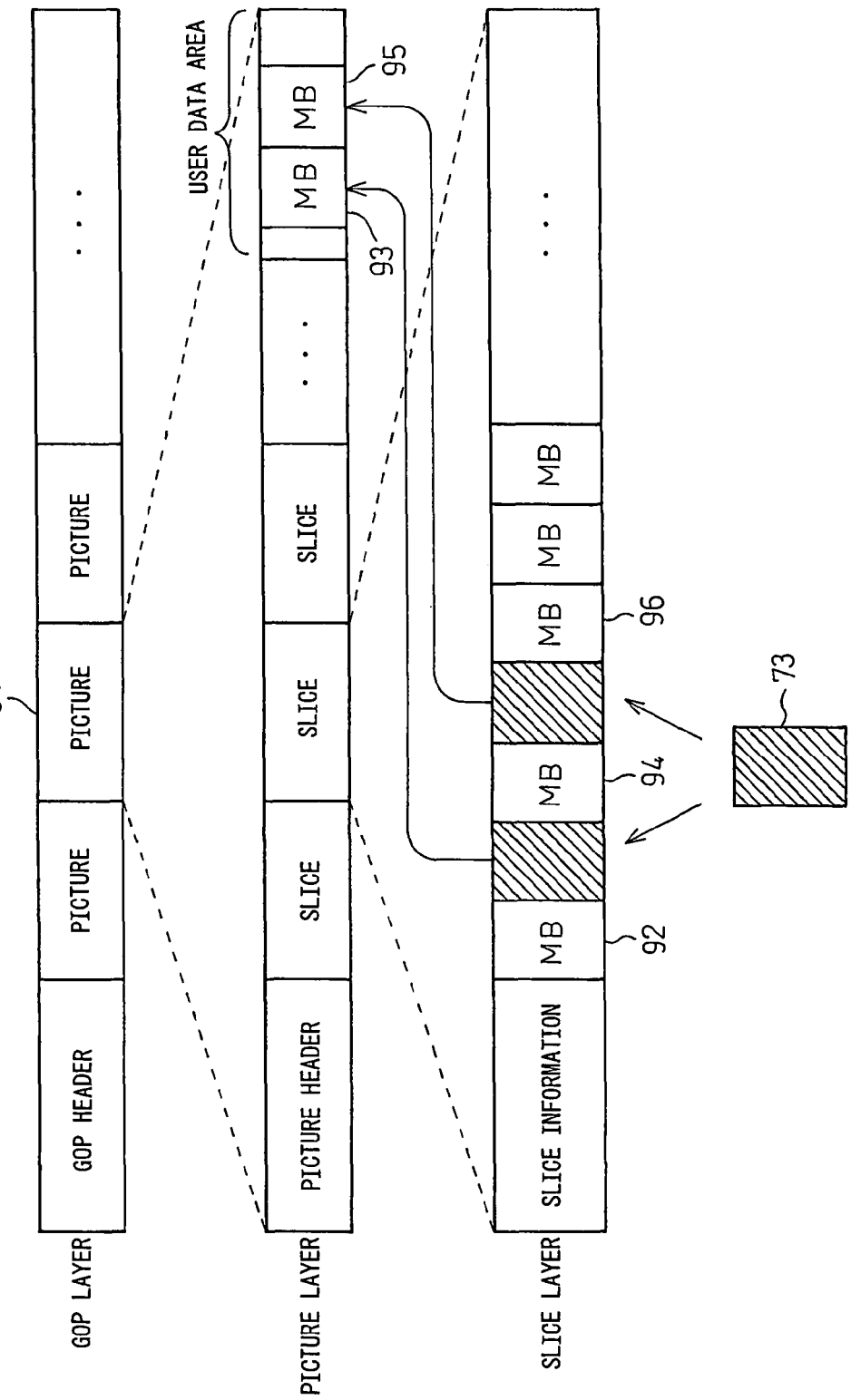

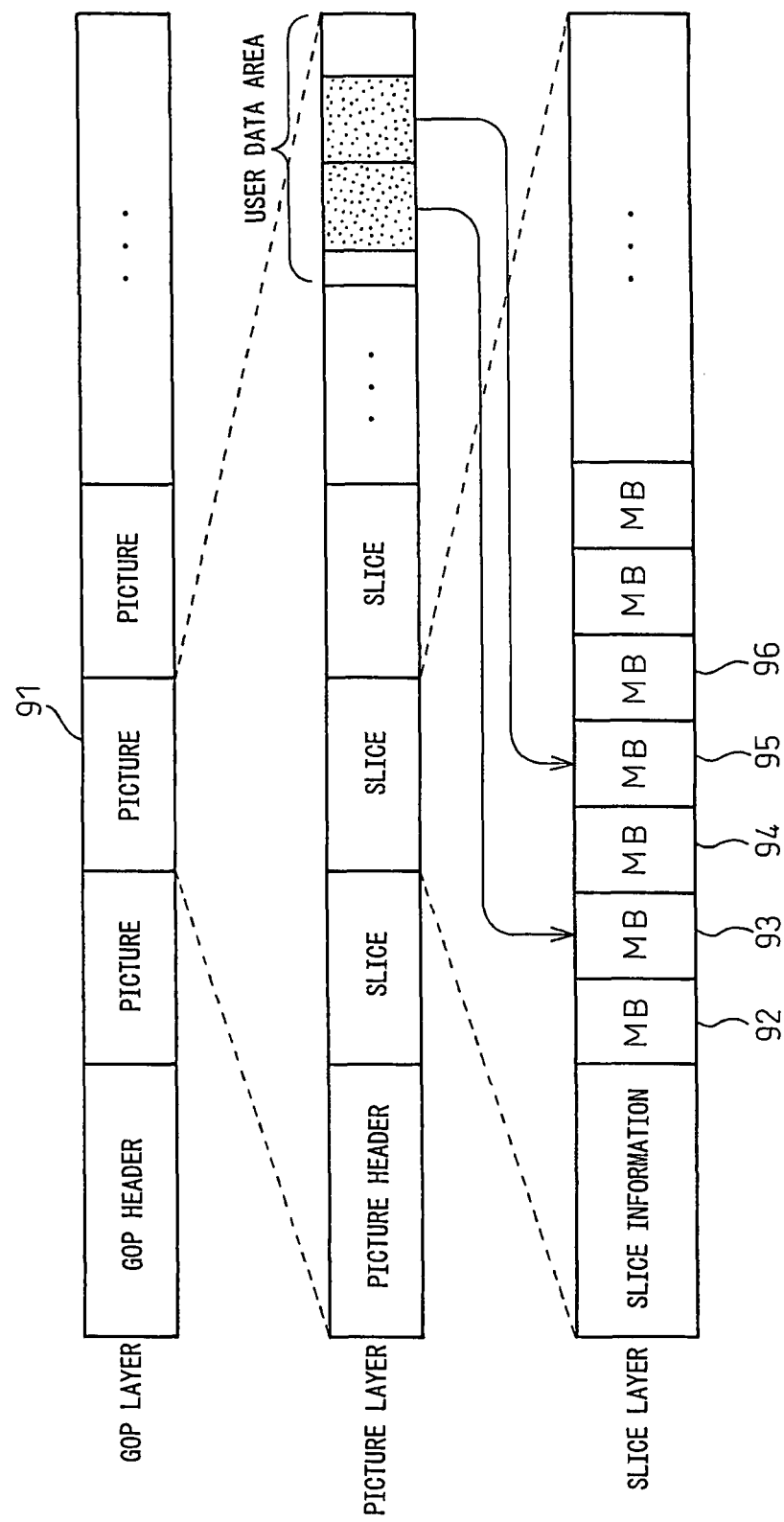

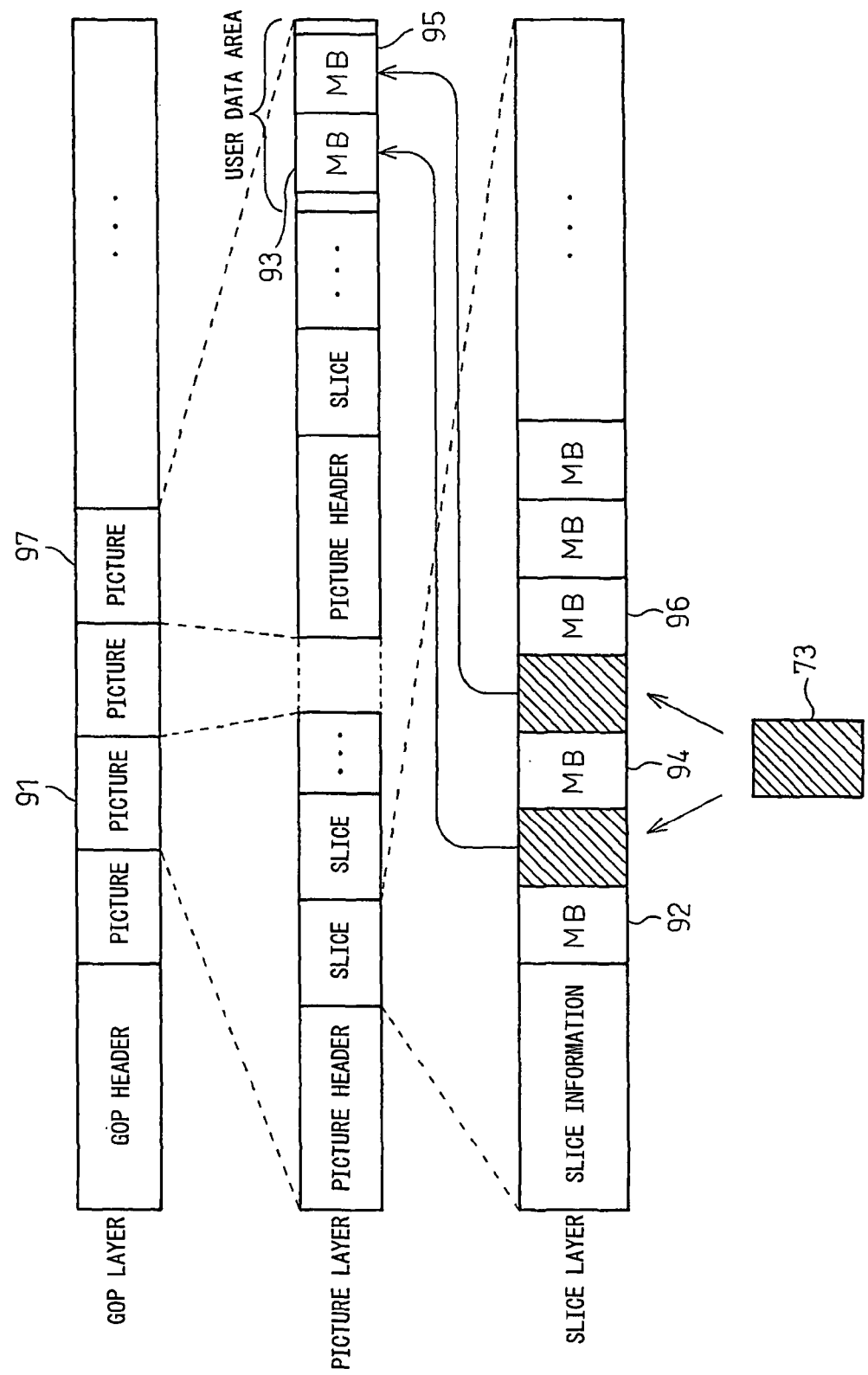

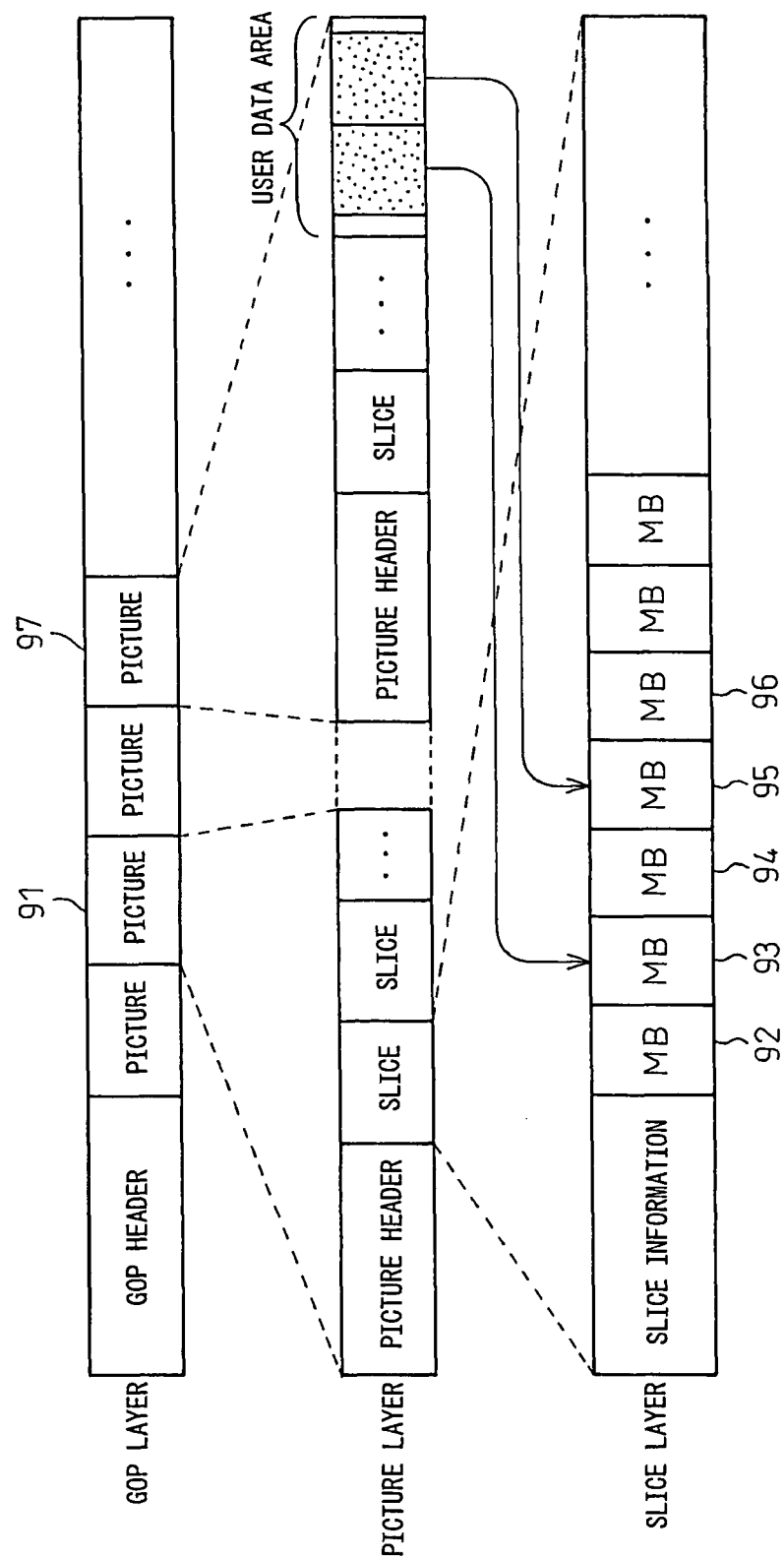

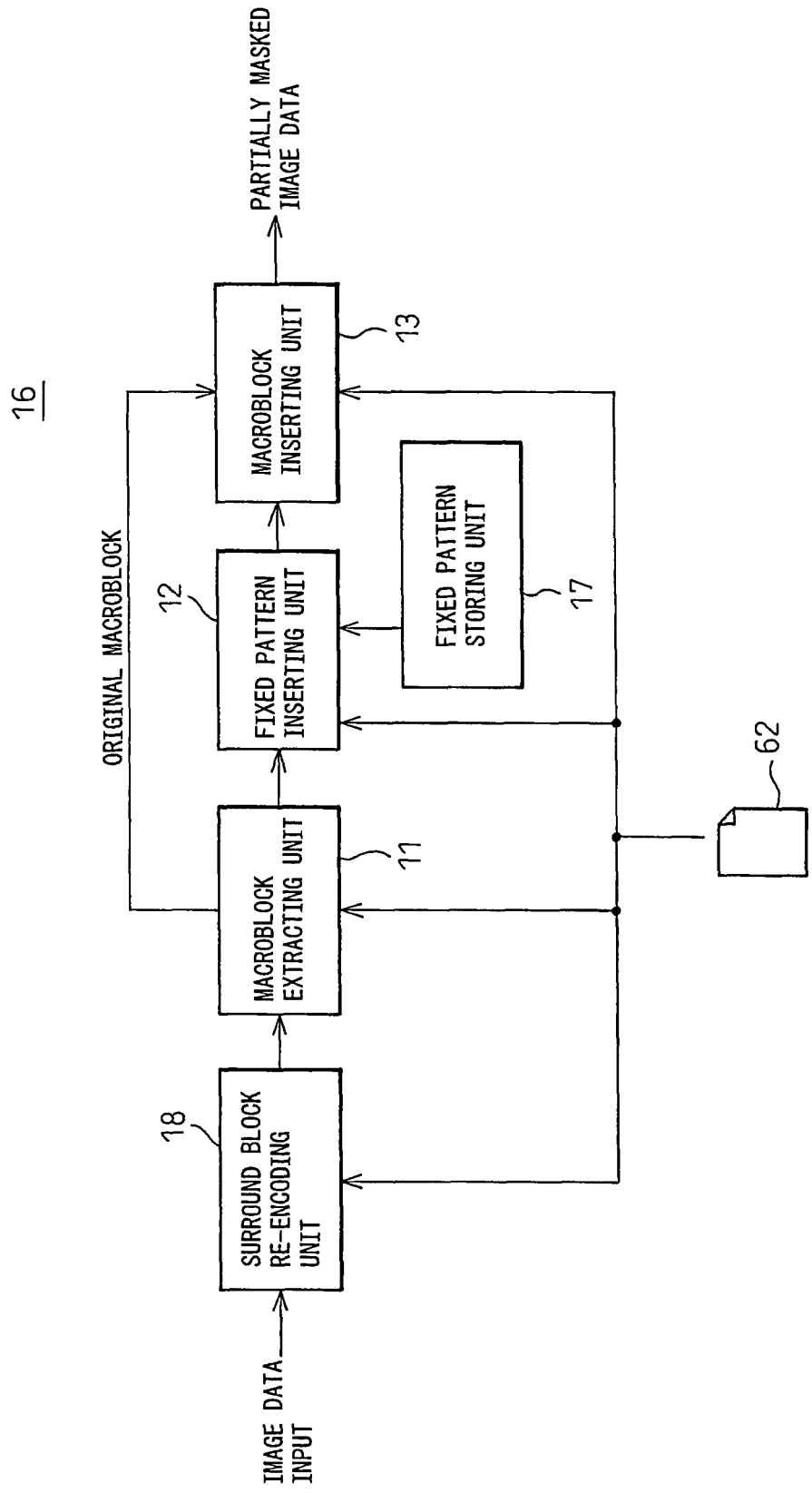

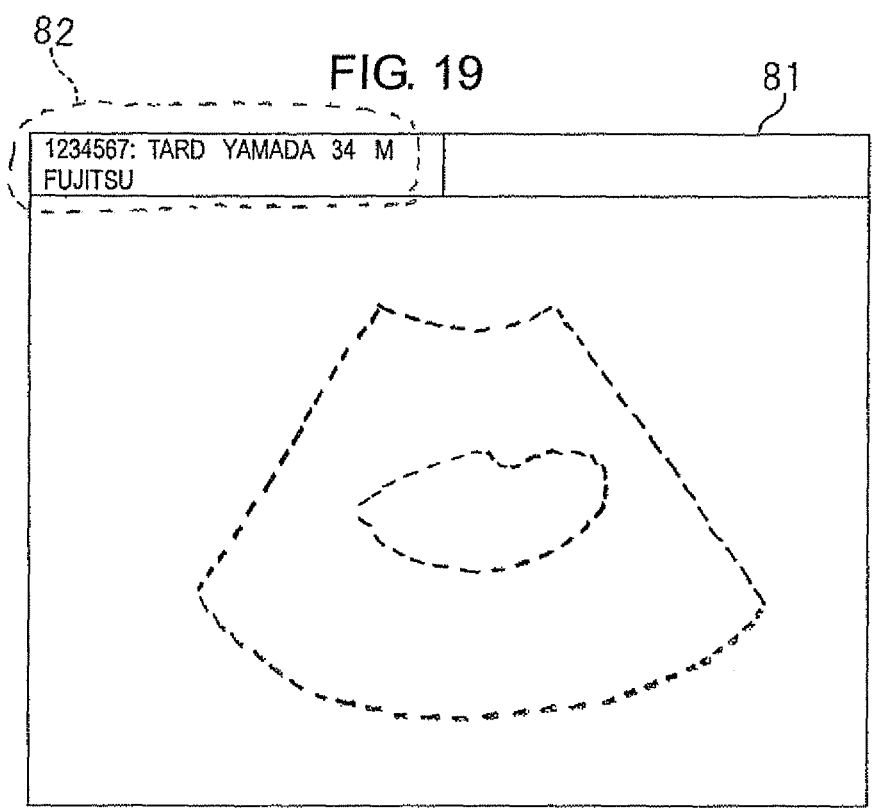

MOVING IMAGE DATA EDITING APPARATUS, MOVING IMAGE DATA REPRODUCING APPARATUS, MOVING IMAGE DATA EDITING METHOD, AND MOVING IMAGE DATA REPRODUCING METHOD

CROSS REFERENCE TO RELATED APPLICATION

The present application is a continuation application based on International application No. PCT/JP2005/005013, filed on Mar. 18, 2005.

TECHNICAL FIELD

The present invention relates to a technique for applying a special visual effect to encoded moving image data and a technique for enabling/disabling such a special visual effect when reproducing the data, and more specifically to a technique for applying a special visual effect to moving image data encoded in accordance with a moving image coding standard such as MPEG (Moving Picture Experts Group) and a technique for enabling/disabling such a special visual effect when reproducing the data.

BACKGROUND ART

When showing or delivering a moving image, it is common to conceal a portion of the moving image for various purposes such as personal information protection. Such image concealment (masking) is done, for example, when using a medical diagnostic video (a moving image obtained by an ultrasonic diagnostic device or an endoscope) or a surgery video for other than its originally intended purpose, for example, medical education purposes.

FIG. 19 is a diagram showing a diagnostic moving image obtained by an ultrasonic diagnostic device. In a diagnostic moving image 81, personal information for identifying the patient is also recorded as shown in a region 82. In medical practice, a medical practitioner can visually check personal information to make sure that the diagnostic moving image based on which he is making a diagnosis is one actually taken of the patent he is seeing.

On the other hand, when showing such a diagnostic moving image to an audience for medical education purposes, the personal information portion of the image must be masked to protect the personal information of the patient.

Further, in the case of an image such as a surgery video, in which the patient can be identified directly from the image being shown, masking must be applied to the image to such a degree that the patient shown in the image cannot be identified.

Patent document 1: Japanese Unexamined Patent Publication No. S64-36460

Patent document 2: Japanese Patent No. 3552945

DISCLOSURE OF THE INVENTION

Problem to be Solved by the Invention

In traditional moving image storing methods which store moving images in analog signal form using a video tape recorder or the like, master moving image data with no masking applied to it and copy data created by applying masking to the master moving image data have had to be prepared so that one or the other can be selected for use according to the purpose. As a result, for the same moving image data, two kinds of data have had to be managed, one with masking and the other without masking, thus making the whole process extremely laborious.

In recent years, with advances in moving image data compression technology, storing moving image data in digital form has come to be widely used, but in the masking method practiced in the prior art, encoded moving image data had to be decoded into the original moving image signal, and masking had to be applied to the original moving image signal by using a special visual effect tool or the like. Then, the moving image signal has to be encoded once again. The process of decoding the moving image data, applying masking to the original moving image signal, and re-encoding the moving image signal not only has required an enormous amount of processing time, but also has involved the problem that image degradation occurs due to the re-encoding of the moving image. Furthermore, as in this case, since master moving image data and copy data have to be prepared, the problem of dual data management remains unsolved.

In the prior art masking method, if the moving image data is to be presented by applying masking or not depending on the purpose of the reproduction, for example, depending on whether the purpose is for medical education or for diagnosis by a medical practitioner, as earlier described, there has been no choice but to prepare two kinds of moving image data, one with masking and the other without masking, and it has not been possible to change the reproduction mode of the same moving image data according to the purpose of the reproduction.

In view of the above problem, it is an object of the present invention to provide a moving image data editing apparatus and a moving image data editing method that can apply masking to a portion of encoded moving image data in a simple and easy manner.

It is a further object of the present invention to provide a moving image data reproducing apparatus and a moving image data reproducing method for reproducing the original moving image without masking from the moving image data processed by masking as described above, thus enabling the mode of reproduction to be changed according to the purpose of the reproduction, as compared to a conventional reproducing machine that directly reproduces the moving image with masking.

Means for Solving the Problem

To achieve the above objects, according to the moving image data editing apparatus and moving image data editing method of the present invention, when applying masking to a portion of the image by editing the moving image data in which each frame is divided into macroblocks of a predetermined size and encoded on a macroblock basis, a macroblock located in the region to be masked is extracted from the input data stream of the moving image data, precoded fixed pattern data is inserted into the position in the data stream at which the extracted macroblock was originally located, and the extracted macroblock is inserted as user data into the data stream.

On the other hand, according to the moving image data reproducing apparatus and moving image data reproducing method of the present invention, when reproducing the moving image data in which each frame is divided into macroblocks of a predetermined size and encoded on a macroblock basis, and in which masking is applied to a portion of the image, the macroblock inserted as the user data is extracted from the input data stream of the moving image data, and the original moving image, which is the moving image before the masking was applied, is reconstructed by inserting the extracted macroblock into the data stream so as to replace the data carried in the macroblock position located within the region to which the masking was applied.

BRIEF DESCRIPTION OF THE DRAWINGS

FIG. 1 is a diagram showing the basic configuration of a moving image data editing apparatus according to the present invention.

FIG. 3 is a diagram explaining the data stream structure of the moving image data in FIG. 2.

FIG. 5 is a diagram explaining how the masking is applied by the moving image data editing apparatus of FIG. 1.

FIG. 10 is a diagram explaining the data stream structure of the MPEG moving image data.

FIG. 11A is a diagram showing the original ultrasonic diagnostic moving image before masking is applied.

FIG. 12 is a diagram showing the configuration of a first embodiment of an analyzing/editing unit shown in FIG. 8.

FIG. 13 is a diagram explaining a first example of the masking applied by the moving image data editing apparatus of FIG. 8.

FIG. 15 is a diagram explaining a first example of how masking is disabled by the moving image data reproducing apparatus of FIG. 14.

FIG. 16 is a diagram explaining a second example of the masking applied by the moving image data editing apparatus of FIG. 8.

FIG. 17 is a diagram explaining a second example of how masking is disabled by the moving image data reproducing apparatus of FIG. 14.

FIG. 18 is a diagram showing the configuration of a second embodiment of the analyzing/editing unit shown in FIG. 8.

FIG. 19 is a diagram showing a diagnostic moving image actually obtained by an ultrasonic diagnostic device.

DESCRIPTION OF THE REFERENCE NUMERALS

1. MOVING IMAGE DATA EDITING APPARATUS
2. MOVING IMAGE DATA REPRODUCING APPARATUS
15. MASK INFORMATION GENERATING UNIT
61. MOVING IMAGE DATA PROCESSED BY MASKING
62. MASK INFORMATION
51. VIDEO CAMERA
53. ORIGINAL MOVING IMAGE DATA STORING UNIT
54. DISPLAY UNIT
71, 81. MOVING IMAGE
72, 82. MASK REGION
73. FIXED PATTERN DATA
B1 to B6. B-PICTURES
BL1 to BL5. PIXEL BLOCKS
BM1 to BM4, MACROBLOCKS
F1 to F6. FRAMES
11, 12. I-PICTURES
P1, P2. P-PICTURES

BEST MODE FOR CARRYING OUT THE INVENTION

Figure 2A:
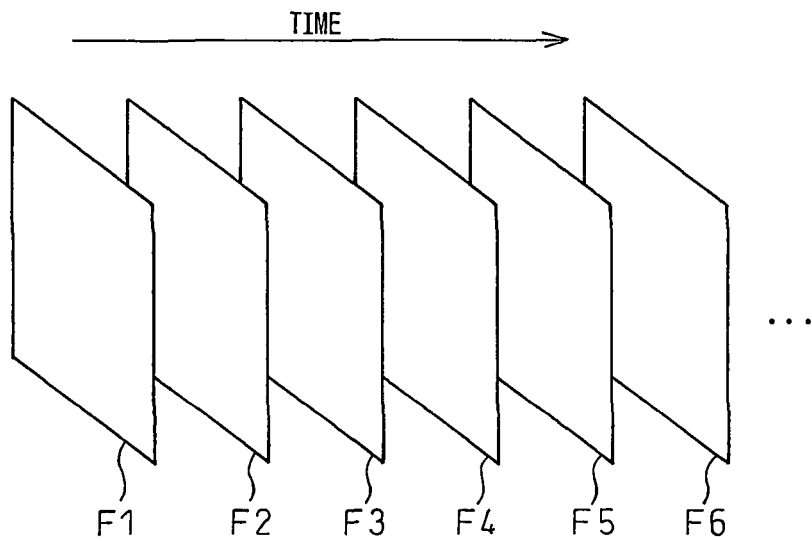
FIG. 2A is a diagram explaining moving image data to which the moving image data editing apparatus of the present invention applies masking, in other words, a diagram explaining a plurality of frames forming the moving image data.
Figure 2B:
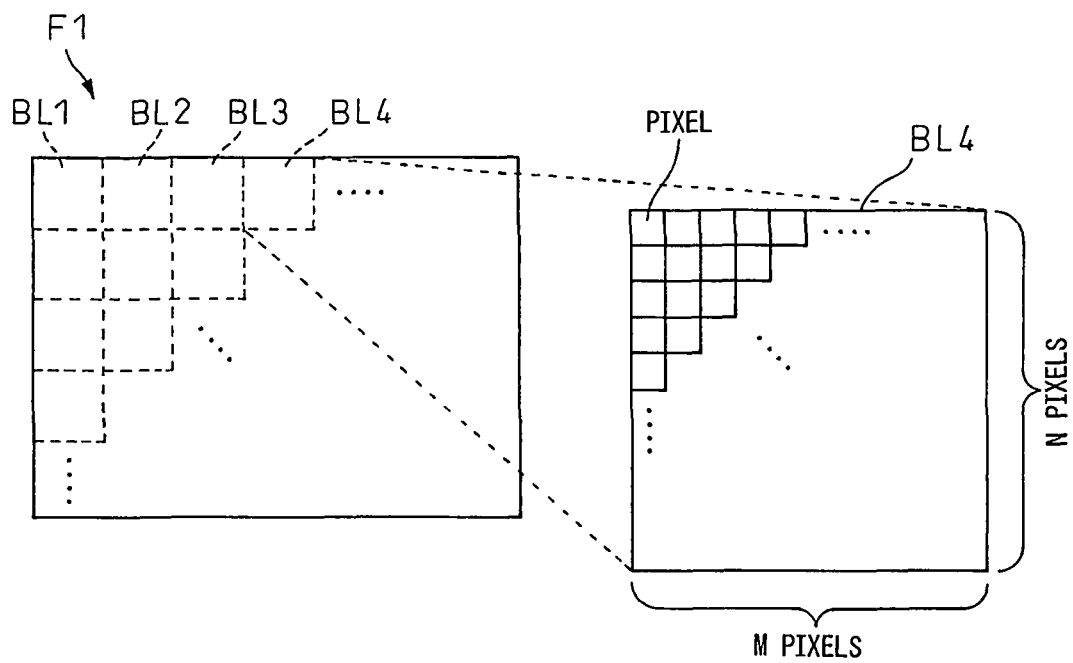
FIG. 2B is a diagram explaining pixel blocks forming each frame in FIG. 2A.

The basic configuration of the present invention will be described below with reference to FIGS. 1 to 7. FIG. 1 is a diagram showing the basic configuration of a moving image data editing apparatus according to the present invention. FIG. 2 is a diagram explaining moving image data to which the moving image data editing apparatus 1 shown in FIG. 1 applies masking: FIG. 2A is a diagram explaining a plurality of frames forming the moving image data, and FIG. 2B is a diagram for explaining pixel blocks forming each frame in FIG. 2A. Further, FIG. 3 is a diagram explaining the data stream structure of the moving image data in FIG. 2.

First, a description will be given of the structure of the moving image data to which the moving image data editing apparatus 1 according to the present invention applies masking. Generally, moving image data comprises, as shown in FIG. 2A, a plurality of images (frames) F1 to F6, etc. which are displayed in time sequential order. Each of the frames F1 to F6, etc., is made up of a plurality of pixels the number of which corresponds to the resolution defined by the image format of the moving image.

When the moving image data is a digital signal, generally the moving image data is encoded and compressed in order to reduce the amount of data. The encoding of the moving image data is done in accordance with the moving image encoding standard to which the moving image data conforms.

The moving image data editing apparatus 1 according to the present invention is intended for editing moving image data generated in accordance with the moving image encoding standard in which each frame forming the moving image data is divided into pixel blocks of a predetermined size and encoded on a pixel block basis. For example, in the example shown in FIG. 2B, each frame is divided into pixel blocks BL1 to BL4, etc., each comprising M×N pixels, and encoded on the pixel block basis.

The data stream structure of the moving image data conforming to such a moving image encoding standard can be generalized as shown in FIG. 3. As shown in the upper part of FIG. 3, the data stream comprises a plurality of frames F1 to F5, etc., which are displayed in sequential order. Each of the frames F1 to F5, etc., comprises a plurality of pixel blocks BL1 to BL5, etc., arranged in sequence to match the positions of the respective blocks within the frame as shown in the lower part of FIG. 3.

It should also be understood that the moving image data that the moving image data editing apparatus 1 according to the present invention is intended to edit conforms to the moving image encoding standard that allows the data stream to include, at least for each frame, a user data area in which user data is to be inserted. The user data here refers to any information that the creator or editor that creates or edits the moving image data can insert in the moving image data in addition to the original moving image information.

The moving image data editing apparatus 1 according to the present invention can apply masking to a portion of the image by editing the moving image data, provided that the moving image data conforms to the commonly employed moving image encoding standard such as described above. For this purpose, the moving image data editing apparatus 1 comprises, as shown in FIG. 1, a pixel block extracting unit 11 for extracting from the input data stream of the moving image data a pixel block that is located within a region to which the masking is to be applied, a fixed pattern inserting unit 12 for inserting precoded fixed pattern data into the position in the data stream at which the extracted pixel block was originally located, and a pixel block inserting unit 13 for inserting the extracted pixel block as user data into the user area in the data stream.

Figure 4A:
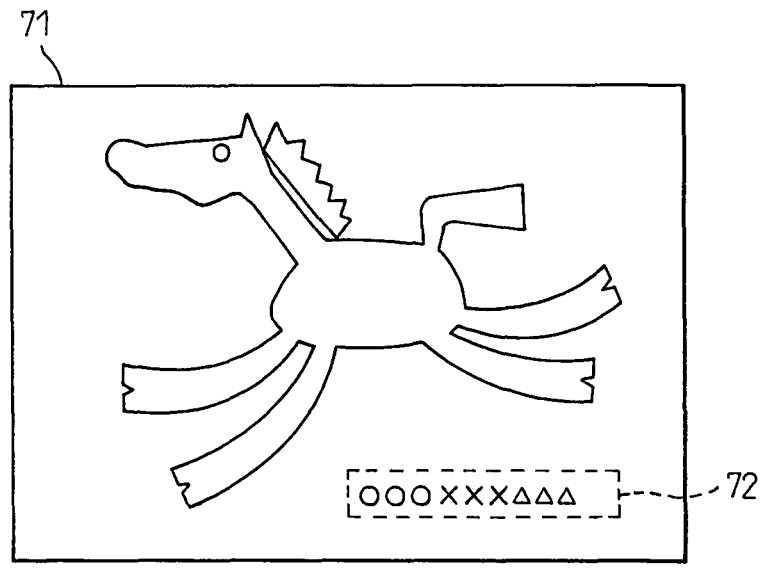
FIG. 4A is a diagram showing the original moving image before masking is applied.
Figure 4B:
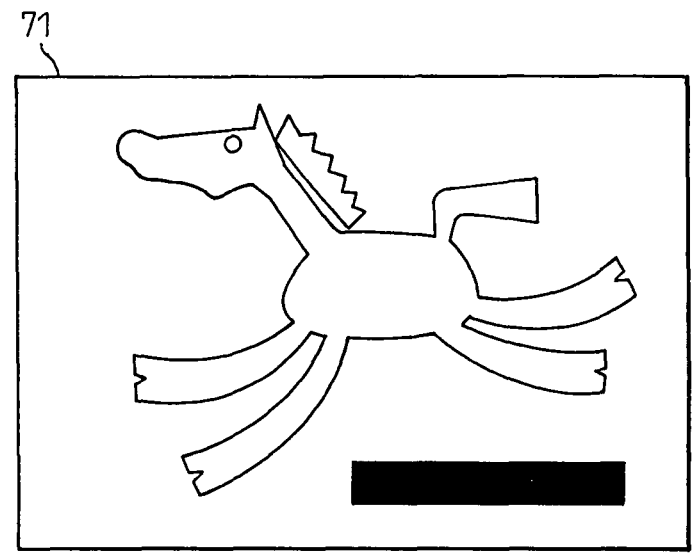
FIG. 4B is a diagram showing the moving image after the masking is applied.

Next, referring to FIGS. 4 and 5, a description will be given of how the masking is applied by the moving image data editing apparatus 1. FIG. 4A is a diagram showing the original moving image before masking is applied, and FIG. 4B is a diagram showing the moving image after masking is applied. Here, in the case where masking is applied to a portion of the moving image 71 of FIG. 4A by filling a dashed-line region 72 with a fixed pattern (for example, a single color) for concealment. By applying such masking, the moving image 71 shown in FIG. 4A will be edited as shown by a partially masked moving image 71 in FIG. 4B.

First, the pixel block extracting unit 11 shown in FIG. 1 extracts the pixel blocks BL2 and BL4 located within the mask region 72 from the input data stream of the original moving image data, as shown in FIG. 5.

Next, the fixed pattern inserting unit 12 shown in FIG. 1 inserts fixed pattern data 73 into the positions in the data stream at which the extracted pixel blocks BL2 and BL4 were originally located. The fixed pattern data 73 may be generated by intra-frame coding a fixed pattern having the same size as the pixel block, or such encoded data may be generated by simulation and stored in advance.

Then, the pixel block inserting unit 13 inserts the extracted pixel blocks BL2 and BL4 as user data into the user data area in the data stream.

When the moving image data thus edited by the moving image data editing apparatus 1 is reproduced on a conventional reproducing apparatus, since the fixed pattern is displayed in the mask region 72, and the user data area is skipped, the partially masked moving image data 71 is displayed as shown in FIG. 4B.

Furthermore, since the moving image data editing apparatus 1 applies masking without decoding or re-encoding the moving image data, the processing time is reduced, and besides, the problem of image degradation due to re-encoding of the moving image does not exist.

Figure 6:
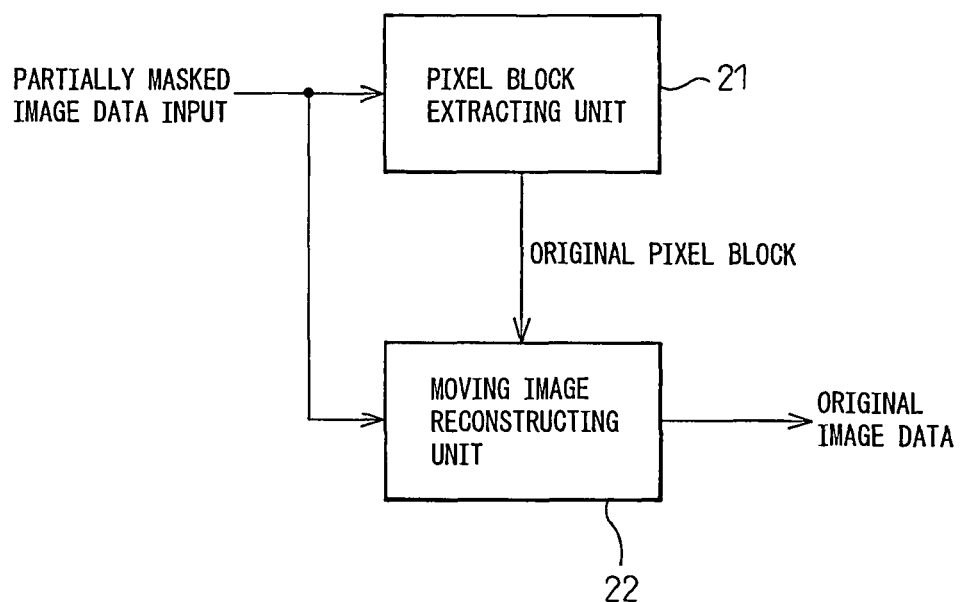
FIG. 6 is a diagram showing the basic configuration of a moving image data reproducing apparatus according to the present invention.

FIG. 6 is a diagram showing the basic configuration of a moving image data reproducing apparatus according to the present invention. The moving image data reproducing apparatus 2 takes as an input the partially masked moving image data edited by the moving image data editing apparatus 1, and reproduces the moving image by reconstructing the original moving image which is the moving image before the masking was applied. For this purpose, the moving image data reproducing apparatus 2 comprises a pixel block extracting unit 21 for extracting the original pixel block inserted as user data from the input data stream of the moving image data, and a moving image reconstructing means 22 for reconstructing the original moving image, which is the moving image before the masking was applied, by inserting the extracted original pixel block into the data stream so as to replace the data carried in the pixel block position located within the mask region.

Figure 7:
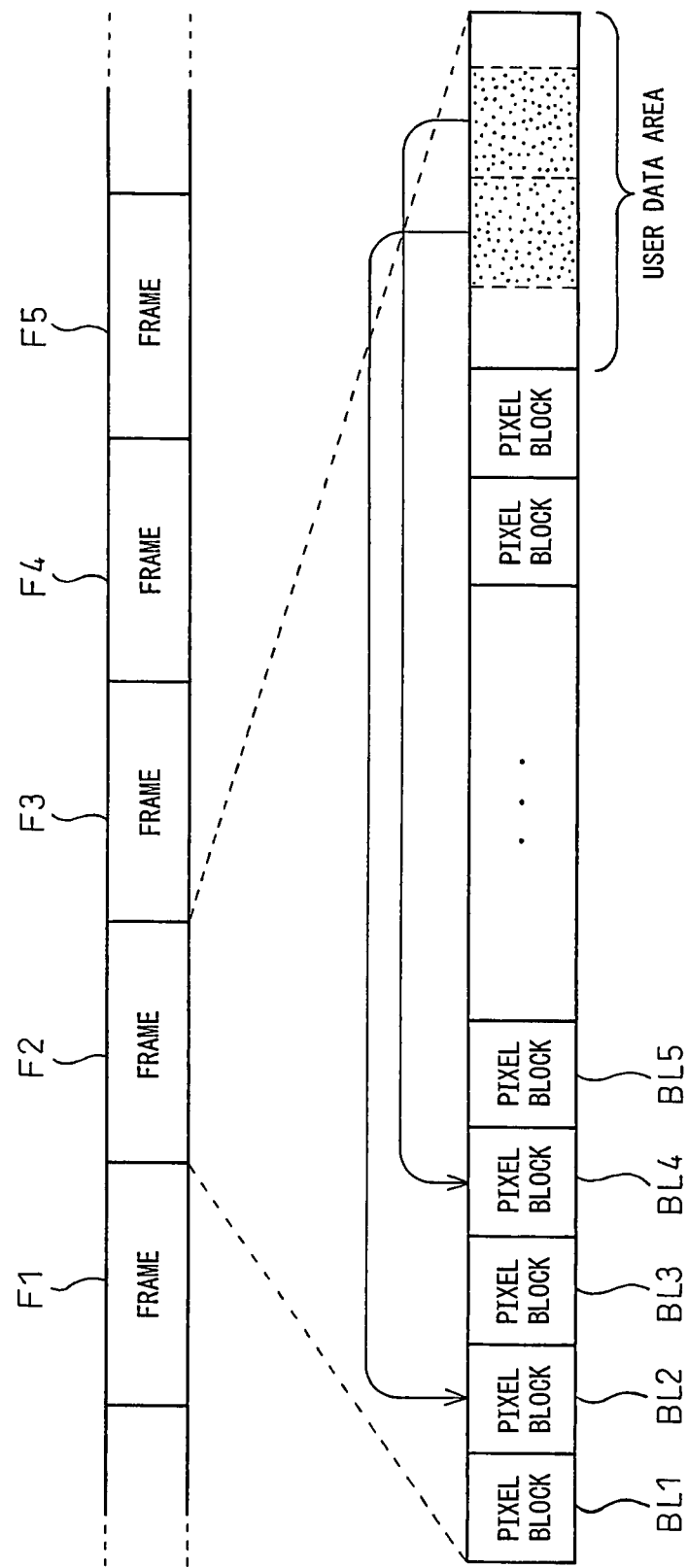
FIG. 7 is a diagram explaining how the masking is disabled by the moving image data reproducing apparatus of FIG. 6.

Referring to FIG. 7, a description will be given of how the masking is disabled by the moving image data reproducing apparatus 2. First, pixel block extracting unit 21 shown in FIG. 6 extracts from the user data area of each frame of the data stream pixel blocks BL2 and BL4 that were originally located in the mask region of the input moving image data, as shown in FIG. 7.

Here, since the fixed pattern data 73 is carried in the corresponding pixel block positions within the mask region in the input data stream, as shown in FIG. 5, moving image data reconstructing means 22 shown in FIG. 6 inserts extracted pixel blocks BL2 and BL4 into their original positions by replacing fixed pattern data 73, as shown in FIG. 7, thereby reconstructing the original moving image, i.e., the moving image before the masking was applied by the moving image data editing apparatus 1.

By decoding the thus reconstructed is image data, the masking shown in moving image 71 of FIG. 4B is disabled, and original moving image 71, as shown in FIG. 4A can be displayed.

Accordingly, if provisions are made to allow the moving image data to be reproduced using the moving image data reproducing apparatus of the present invention only for specific institutions, people, places, etc. (in the case of the previously described diagnostic moving image, only for purposes of medical treatment where there is no need to mask the personal information portion), then the masking is disabled only when reproducing the moving image data at specific institutions by specific people; on the other hand, when reproducing the moving image data using a conventional reproducing apparatus for unspecific institutions or persons, the masking remains enabled. In this way, the same moving image data can be reproduced by switching the mode according to the purpose of the reproduction.

Figure 8:
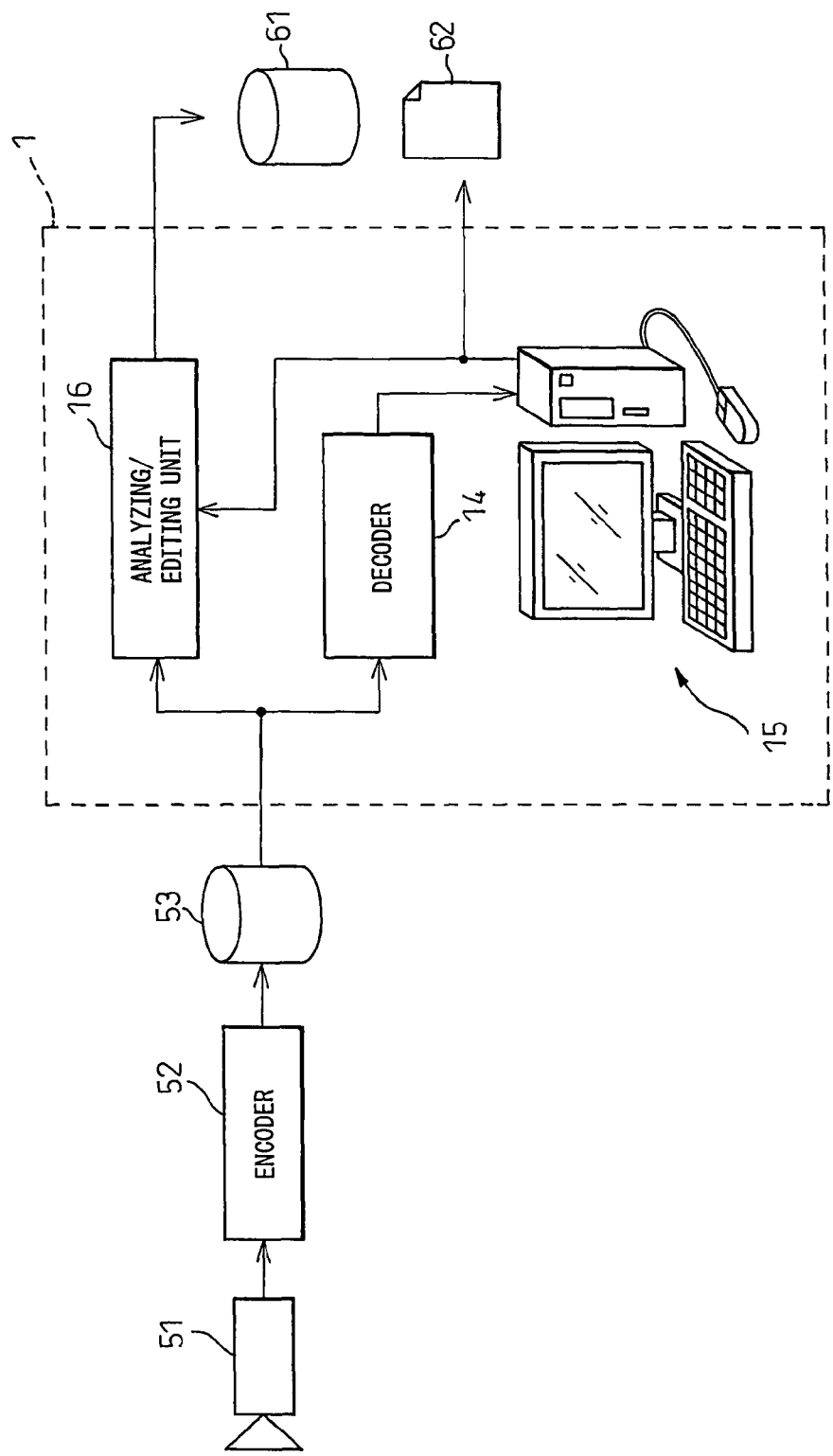
FIG. 8 is a diagram showing the general configuration of an embodiment of the moving image data editing apparatus according to the present invention.

Embodiments of the present invention will be described below with reference to FIGS. 8 to 18. FIG. 8 is a diagram showing the general configuration of an embodiment of the moving image data editing apparatus according to the present invention.

Moving image data editing apparatus 1 comprises: a decoder 14 which decodes the encoded original moving image data input thereto; a mask information generating unit 15, as an insert position information generating means according to the present invention, which takes the decoded moving image data as an input and displays the moving image so that an operator can enter a masking instruction while viewing the displayed moving image, and which accepts instructions and thereby generates mask information 62 for masking; and an analyzing/editing unit 16 which analyzes the encoded original moving image data input thereto, applies masking to the encoded original moving image data in accordance with the mask information 62 generated by the mask information generating unit 15, and outputs moving image data 61 thus processed by masking.

The encoded original moving image data input to the moving image data editing apparatus 1 may be, for example, moving image data obtained by encoding an analog video signal captured by a video camera 51 into a digital form by a generally available encoder 52. Then, the encoded original moving image data thus obtained may be stored in an original moving image data storing unit 53 that can be implemented using a storage device such as a hard disk drive unit or a memory device or a removable recording medium such as a CD-ROM or a DVD, and the encoded original moving image data may be retrieved from original moving image data storing unit 53 for input to moving image data editing apparatus 1.

Next, a description will be given of how the moving image data editing apparatus 1 applies masking to the moving image data encoded in accordance with the MPEG format, a moving image encoding standard.

Figure 9A:
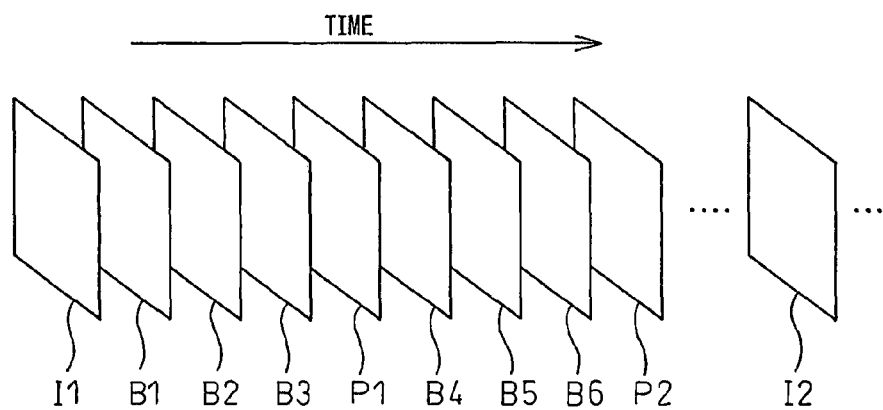
FIG. 9A is a diagram explaining a plurality of pictures forming MPEG moving image data.

FIG. 9A is a diagram explaining a plurality of pictures forming the MPEG moving image data. As shown, the MPEG moving image data is made up of a plurality of frames called pictures 11, B1 to B3, P1, B4 to B6, P2, . . . , 12, etc. which are displayed in time sequential order. The pictures are classified into three types according to the type of encoding, which include I-pictures 11, 12, etc., as intra-frame coded pictures, P-pictures P1, P2, etc., as forward predictive coded pictures, and B-pictures B1 to B6, etc., as bi-directional predictive coded pictures. In the embodiments hereinafter described, the images forming the moving image data and displayed in time sequential order are referred to as the "pictures" which are equivalent to the "frames" forming the moving image data previously described in connection with the basic configuration of the present invention with reference to FIGS. 1 to 7.

Figure 9B:
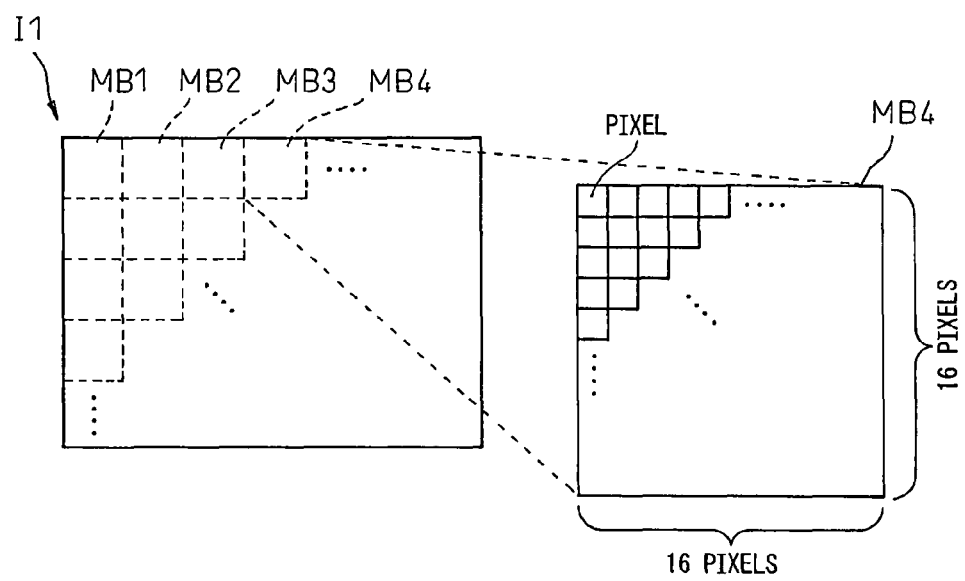
FIG. 9B is a diagram explaining macroblocks forming each picture of FIG. 9A.

In the MPEG coding scheme, to perform motion-compensated predictive coding in the P- and B-pictures, each picture is divided into blocks of 16×16 pixels, forming a plurality of macroblocks MB1 to MB4, etc., as shown in FIG. 9B, and predictive coding is done by performing block matching on a macroblock basis. In any picture, whether it be an I-picture, a P-picture, or a B-picture, when intra-frame coding macroblocks, the coefficient of the DC component in the DCT coefficients is encoded for each macroblock.

FIG. 10 is a diagram explaining the data stream structure of the MPEG moving image data. As shown, the data stream structure of the MPEG moving image data comprises a sequence layer, a GOP layer, a picture layer, a slice layer, and a macroblock layer.

The sequence layer is a layer containing the code for the whole video program and this layer begins with a sequence header and comprises one or more GOPs (Groups of Pictures).

The GOP layer contains a group of pictures which consists of an I-picture and either or both of P- and B-pictures, and which can be used as a point for random access from the MPEG data. For this purpose, the first picture of each GOP is always an I-picture. A GOP header containing time stamp information for achieving synchronization with voice, etc., at the time of decoding is inserted at the beginning of each GOP.

The picture layer corresponds to each individual one of the image frames of the moving image signal, and generally comprises only one type of picture, an I-picture, a P-picture, or a B-picture. A picture header containing information for identifying the type of picture, an I-picture, a P-picture, or a B-picture, as well as information indicating the order of display of the picture, is inserted at the beginning of each picture. The picture layer contains one or more slices each indicating a horizontally sliced region in the picture. Each picture layer may further include a user data area for carrying user data.

The slice layer contains one or more macroblocks. When each picture is divided into a plurality of slices, if an error occurs in a certain slice layer, it is possible to recover from the error in the next slice layer. Slice information containing such information as the quantization characteristics used in the slice is inserted at the beginning of each slice layer.

The macroblock layer comprises a plurality of blocks of 8×8 pixels, which together form a macroblock. Macroblock information inserted at the beginning of the macroblock layer contains, for example, information about the type of coding which indicates whether the macroblock is intra-frame coded or motion-compensated coded.

Turning back to FIG. 8, the mask information generating unit 15 may be implemented using a computing means such as a personal computer which comprises: a display unit such as a CRT or a liquid crystal display that can display the moving image data decoded by the decoder 14 for viewing by the operator; an input unit such as a keyboard, mouse, touch pen, touch pad, etc. necessary for the operator to enter a masking instruction while viewing the displayed moving image; an output interface via which the generated mask information 62 is output to the analyzing/editing unit 16; and a flexible disk drive unit or removable disk drive unit that can output the mask information 62 in a form ready to distribute as the analyzing/editing unit 16 outputs the partially masked moving image data 61.

Figure 11B:
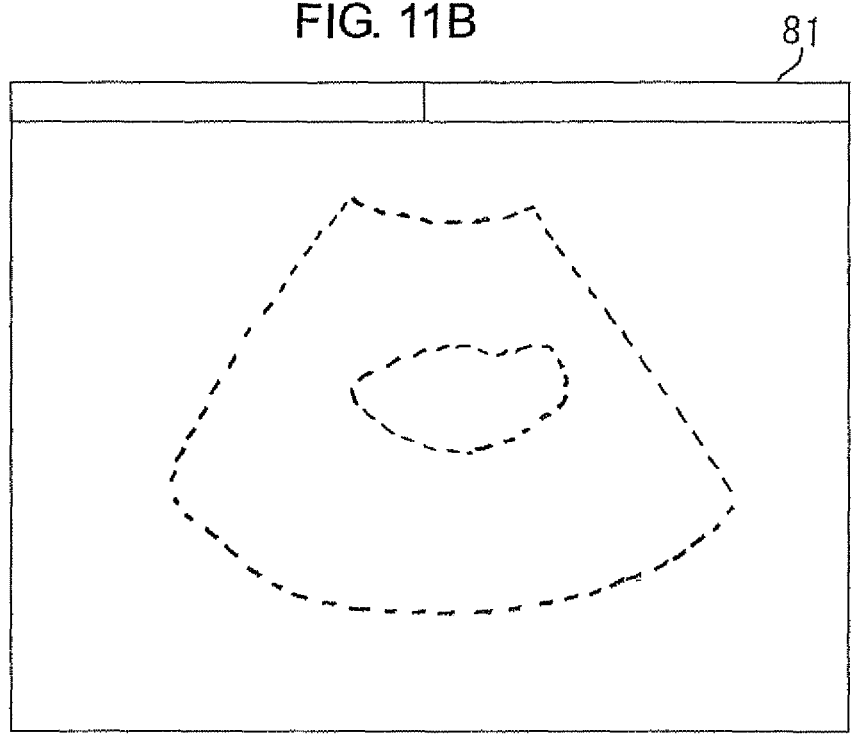
FIG. 11B is a diagram showing the ultrasonic diagnostic moving image after the masking is applied.

Next, a description will be given of a procedure by which the operator who is editing ultrasonic diagnostic moving image data enters instructions for masking. FIG. 11A is a diagram showing the original ultrasonic diagnostic moving image before the masking is applied, and FIG. 11B is a diagram showing the ultrasonic diagnostic moving image after the masking is applied. Here, in a case where masking is applied to a portion of moving image 81 of FIG. 11A by filling a dashed-line region 82 with a fixed pattern (for example, all in red) for concealment. By applying such masking, moving image 81 shown in FIG. 11A will be edited as shown by a partially masked moving image 81 in FIG. 11B.

To specify the region (mask region 82) in moving image 81 to which the masking is to be applied, the operator editing the moving image data, while viewing the moving image 81 displayed on the display unit of the mask information generating unit 15, specifies a certain range on the screen by using, for example, a mouse, thus pointing to mask region 82 in moving image 81 to which the masking is to be applied. The operator further specifies the kind of masking to be applied to mask region 82, by entering instructions from the keyboard or by operating the mouse on a GUI (Graphical User Interface) that an application running on the mask formation generating unit 15 displays on the display unit.

When the masking instruction entered by the operator is received, mask information generating unit 15 generates mask information based on the instructions. A first example of mask information 62 is shown in Table 1.

TABLE 1

| PICTURE NUMBER | MACROBLOCK NUMBER | PATTERN |
|---|---|---|
| I1 | 10, 40 | red-fill |
| I1 | 11, 40 | red-fill |
| I1 | 12, 40 | red-fill |
| I1 | 10, 41 | red-fill |
| I1 | 11, 41 | red-fill |
| I1 | 12, 41 | red-fill |
| B1 | 10, 40 | red-fill |
| B1 | 11, 40 | red-fill |
| B1 | 12, 40 | red-fill |
| B1 | 10, 41 | red-fill |
| B1 | 11, 41 | red-fill |
| B1 | 12, 41 | red-fill |
| . | . | . |
| . | . | . |
| . | . | . |
| I101 | 30, 50 | red-fill |
| I101 | 31, 50 | red-fill |
| I101 | 32, 50 | red-fill |
| I101 | 30, 51 | red-fill |

TABLE 1-continued

| PICTURE NUMBER | MACROBLOCK NUMBER | PATTERN |
|---|---|---|
| I101 | 31, 51 | red-fill |
| I101 | 32, 51 | red-fill |
| . | . | . |
| . | . | . |
| . | . | . |

As shown in Table 1, for each picture to which the masking is to be applied, mask information generating unit 15, based on instructions from the operator, specifies the macroblocks located in mask region 82 of the image. In the example of Table 1, the macroblocks located at the intersections of the 10th to 12th columns and the 40th to 41st rows, as counted from the upper left corner of the image, are specified for picture I1.

At the same time, the kind of masking to be applied to mask region 82 is specified. For this purpose, an attribute value ("red-fill") indicating the kind of masking may be used, for example, as shown in the example of Table 1.

When the mask information is organized as described above, the operator can freely change the position of mask region 82 for any picture partway through the video sequence, as can be seen from the specifications made for the picture I101 in Table 1. It is of course possible to change the kind of masking at the same time.

FIG. 12 is a diagram showing the configuration of a first embodiment of the analyzing/editing unit 16 shown in FIG. 8. The analyzing/editing unit 16 comprises: a macroblock extracting unit 11 which extracts from the input data stream of the original moving image data a macroblock located in the area to be masked, based on the information concerning the position of the mask region 82 (in the example of Table 1, the information specifying each macroblock located in mask region 82) contained in mask information 62 generated by mask information generating unit 15; a fixed pattern inserting unit 12 which, based on the information concerning the kind of masking contained in mask information 62, inserts corresponding fixed pattern data into the position in the data stream at which the extracted macroblock was originally located; and a macroblock inserting unit 13 which inserts the extracted macroblock as user data into the user area in the data stream.

The analyzing/editing unit 16 further comprises a fixed pattern storing unit 17 which stores fixed pattern data to be inserted by fixed pattern inserting unit 12. Fixed pattern storing unit 17 stores the fixed pattern data for each kind of masking, and in accordance with instructions contained in the mask information 62 for specifying the kind of masking, analyzing/editing unit 16 selects the fixed pattern data to be inserted in mask region 82 from among the plurality of kinds of fixed pattern data stored in the fixed pattern storing unit 17.

The fixed pattern on which each individual fixed pattern data is based is composed of image data having the same size as the previously described macroblock (i.e., 16×16 pixels), and encoded image data generated by intra-frame coding each individual fixed pattern is stored as the fixed pattern data in fixed pattern storing unit 17. Here, fixed pattern data 73 may be generated by actually intra-frame coding the fixed pattern or may be generated by simulation.

Analyzing/editing unit 16 can be implemented using a computing means constructed from a workstation or a personal computer or the like, and each component element of analyzing/editing unit 16 may be implemented by a software module for carrying out the corresponding function or by a dedicated hardware circuit.

Next, referring to FIG. 13, a description will be given of how masking is applied by moving image data editing apparatus 1.

First, based on mask information 62, macroblock extracting unit 11 shown in FIG. 12 identifies the positions of the macroblocks (designated "MBs" in FIG. 13) located within the range of mask region 82 from among the macroblocks contained in the slice layer of the input data stream of the original moving image data, and extracts macroblocks 93 and 95 from the identified positions (see FIG. 13).

Next, from among the plurality of kinds of fixed pattern data prestored in fixed pattern data storing unit 17, fixed pattern inserting unit 12 shown in FIG. 12 selects pattern data 73 that matches the kind of masking specified in mask information 62. Then, fixed pattern inserting unit 12 inserts selected fixed pattern data 73 into the positions where macroblocks 93 and 95 were originally located in the slice layer of data stream.

Subsequently, the macroblock inserting unit 13 inserts extracted macroblocks 93 and 95 as user data into the user area provided for each picture layer of the data stream, and outputs the thus edited data stream as partially masked moving image data 61.

Here, when the mask information is created in accordance with the first example shown in Table 1, the mask information, unlike the second example shown in Table 2 later, does not contain information that specifies in which picture's user area the extracted macroblocks should be inserted. Accordingly, macroblock inserting unit 13 inserts macroblocks 93 and 95 into the user area of the same picture from which they were extracted. In this case, position information indicating the positions within the image at which extracted macroblocks 93 and 95 were originally located may be inserted in the user area together with these macroblocks.

As previously described with reference to FIG. 9, each picture is encoded on a macroblock basis. Accordingly, by inserting the intra-frame coded fixed pattern data in place of the extracted macroblocks, the partially masked moving image data can be reproduced without error on any reproducing apparatus that conforms to the MPEG format.

When the thus edited partially masked moving image data is reproduced on a conventional reproducing apparatus, since the fixed pattern is displayed in mask region 82, and the user data area is skipped, partially masked moving image 81 is displayed as shown in FIG. 11B.

Figure 14:
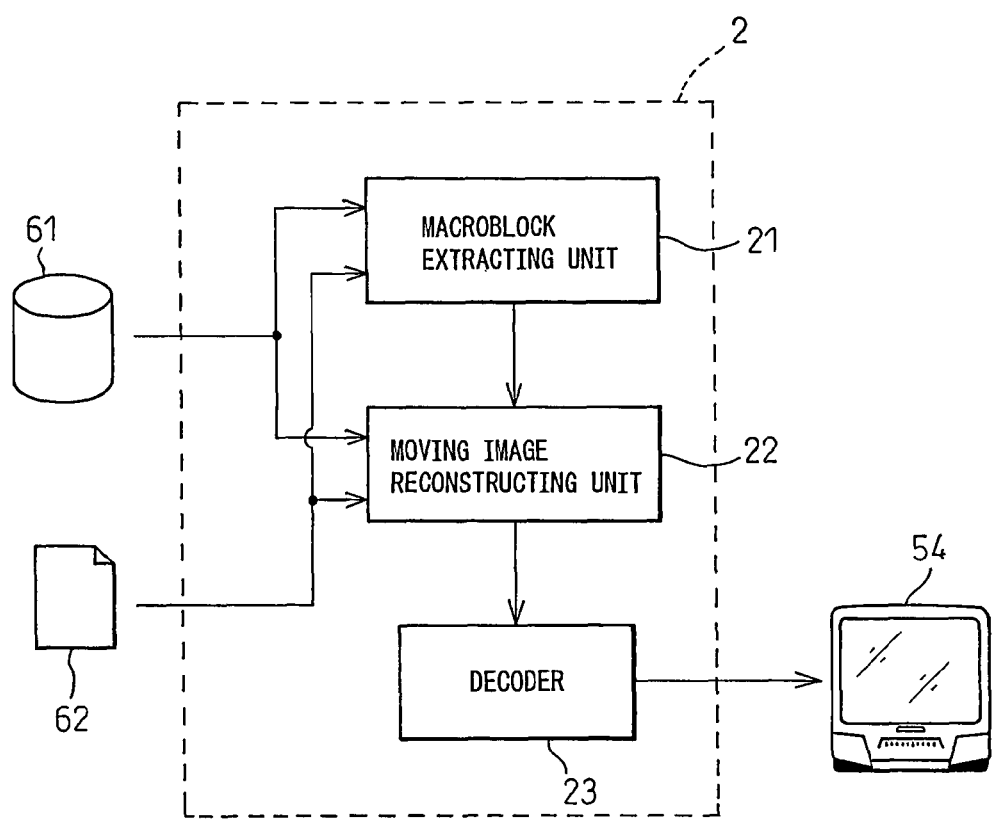
FIG. 14 is a diagram showing the general configuration of an embodiment of the moving image data reproducing apparatus according to the present invention.

FIG. 14 is a diagram showing the basic configuration of the moving image data reproducing apparatus according to the present invention. Moving image data reproducing apparatus 2 takes as inputs mask information 62 and partially masked moving image data 61 edited by moving image data editing apparatus 1, reconstructs the original moving image, i.e., the moving image before masking was applied, and displays it on a display unit 54.

For this purpose, the moving image data reproducing apparatus 2 comprises: a macroblock extracting unit 21 which, based on mask information 62, extracts from the input data stream of moving image data 61 the original macroblocks that are inserted as user data in the user area of each picture layer; and a moving image reconstructing means 22 for reconstructing the original moving image, i.e., the moving image before the masking was applied, by inserting the extracted original macroblocks into the data stream so as to replace the fixed pattern data inserted in the macroblock positions located within the mask region of each picture.

Next, referring to FIG. 15, a description will be given of how masking is disabled by the moving image data reproducing apparatus 2. First, when mask information 62 is given, the macroblock extracting unit 21 shown in FIG. 14 examines mask information 62 and identifies which picture in the input moving image data 61 is processed by masking.

Then, based on mask information 62, mask region 82 is identified in each picture to which the masking has been applied, and macroblocks 93 and 95 originally located in mask region 82 are extracted from the user data area of that picture (see FIG. 15).

Since fixed pattern data 73 inserted by moving image data editing apparatus 1 is carried in each macroblock position located within mask region 82 in the input data stream, moving image reconstructing means 22 shown in FIG. 14 reconstructs the original moving image, i.e., the moving image before the masking was applied, by inserting extracted original macroblocks 93 and 95 in place of fixed pattern data 73.

Here, when moving image data editing apparatus 1 applied the masking by inserting in the user data area of the picture the position information indicating the positions within the image at which extracted macroblocks 93 and 95 were originally located, as earlier described, moving image data reproducing apparatus 2 can reconstruct the original moving image without relaying on mask information 62.

In this case, for each picture contained in input moving image data 61, macroblock extracting unit 21 in the moving image data reproducing apparatus 2 determines whether macroblock information is carried in the user data area. If macroblock information is carried, the macroblock position information inserted in the user data area is extracted to identify mask region 82. In other words, the positions within the moving image data 61 at which extracted macroblocks 93 and 95 are to be inserted are identified. Then, based on this position information, moving image reconstructing means 22 inserts extracted macroblocks 93 and 95 into their original positions within the moving image data.

When outputting mask information 62 in a form ready to distribute as the partially masked moving image data 61 is outputted, the mask information generating unit 15 may output the mask information in encrypted form so that it cannot be easily deciphered.

Next, a description will be given of the case where the macroblocks extracted from each picture are inserted into the user data area of a different picture than the picture from which they were extracted.

If the macroblocks extracted from each picture are inserted into the user data area of the same picture from which they were extracted, as described above, the storage location of the extracted macroblocks can be easily identified, giving rise to the concern that the masking might be disabled, for example, by a malicious user who happened to know the masking procedure. In view of this, in the example described hereinafter, the macroblocks extracted from each picture are inserted into the user data area of a different picture than the picture from which they were extracted, thereby making it difficult to locate the positions of the extracted macroblocks and thus preventing the masking from being disabled by an unauthorized user.

For this purpose, the mask information generating unit 15, upon receiving the masking instruction from the user, determines the destination picture into which each macroblock extracted from mask region 82 of the picture to be processed by masking is to be inserted, and generates mask information 62 as shown in Table 2 below. The second example of mask information 62 is shown in Table 2.

TABLE 2

| MASK POSITION | | MACROBLOCK DESTINATION | | |
|---|---|---|---|---|
| PICTURE NO. | MACROBLOCK NO. | PICTURE NO. | NO. | MASK PATTERN |
| I1 | 10, 40 | P2 | 1 | red-fill |
| I1 | 11, 40 | P1 | 3 | red-fill |
| I1 | 12, 40 | B2 | 2 | red-fill |
| I1 | 10, 41 | B4 | 3 | red-fill |
| I1 | 11, 41 | I2 | 1 | red-fill |
| I1 | 12, 41 | B1 | 1 | red-fill |
| B1 | 10, 40 | P1 | 2 | red-fill |
| B1 | 11, 40 | P2 | 3 | red-fill |
| B1 | 12, 40 | B4 | 5 | red-fill |
| B1 | 10, 41 | B3 | 4 | red-fill |
| B1 | 11, 41 | B1 | 1 | red-fill |
| B1 | 12, 41 | B2 | 2 | red-fill |
| . | . | . | . | . |
| . | . | . | . | . |
| . | . | . | . | . |

As shown in Table 2, the second example of mask information 62 contains information about the destination to which each macroblock extracted from mask region 82 is to be moved. In the example of Table 2, the macroblock located, for example, at the intersection of the 10th column and the 40th row, as counted from the upper left corner of the picture I1 shown in the first entry of the table, is inserted into the first macroblock position in the user data area contained in the picture layer of the picture P2, while the macroblock located at the intersection of the 11th column and the 40th row, as counted from the upper left corner of the picture I1 shown in the second entry, is inserted into the third macroblock position in the user data area contained in the picture layer of the picture P1.

Table 2 has shown an example in which the macroblocks extracted from mask region 82 of the same picture are inserted as user data into respectively different pictures, but alternatively, all the macroblocks extracted from mask region 82 of the same picture may be inserted as user data into one specific picture other than the picture from which there were extracted.

Next, referring to FIG. 16, a description will be given of how masking is applied according to the second example of mask information 62.

First, based on mask information 62, macroblock extracting unit 11 shown in FIG. 12 identifies the positions of the macroblocks (designated "MBs" in FIG. 16) located within the range of mask region 82 from among the macroblocks contained in picture 91 in the input data stream of the original moving image data, and extracts macroblocks 93 and 95 from the identified positions (see FIG. 16).

Next, fixed pattern inserting unit 12 shown in FIG. 12 inserts selected fixed pattern data 73 into the positions within picture 91 of the data stream at which macroblocks 93 and 95 were originally located.

Subsequently, the macroblock inserting unit 13 inserts extracted macroblocks 93 and 95 into the user data area of picture 97 which is different from picture 91 and which is specified as the macroblock destination by mask information 62. Here, if the insert positions or ordering of the macroblocks within the user data area are specified by mask information 62, the macroblocks are inserted in accordance with the specified positions or ordering. Then, the thus edited data stream is output as partially masked moving image data 61.

Next, a procedure for disabling masking applied to the moving image data in accordance with the second example of mask information 62 will be described below with reference to FIG. 17.

First, macroblock extracting unit 21 shown in FIG. 14 examines mask information 62 and identifies which picture in the input moving image data 61 is processed by masking (in the illustrated example, picture 91 is identified as being the picture processed by masking). Then, based on mask information 62, mask region 82 of picture 91 to which masking has been applied is identified.

Next, macroblock extracting unit 21 extracts macroblocks 93 and 95, both originally located in mask region 82, from the user data area of picture 97 specified as the macroblock destination in mask information 62 (see FIG. 17).

Then, moving image reconstructing means 22 shown in FIG. 14 reconstructs the original moving image, i.e., the moving image before the masking was applied, by inserting extracted original macroblocks 93 and 95 so as to replace fixed pattern data 73 in the picture 91.

The moving image data may contain a portion with much motion and a portion with little motion in one image as in the case of medical diagnostic moving image data such as shown in FIG. 11A. In the medical diagnostic moving image shown in FIG. 11A, for example, dashed-line region 82 is a region for displaying personal information, etc., and has no motion, while the other regions are moving image portions showing the movement of an internal organ to be diagnosed.

When the still image portion (in the illustrated example, the portion containing the person-identifying information) is specified as mask region 82, most of its image information is stored in an I-picture, i.e., an intra-frame coded picture, and little image information of that portion is contained in P-pictures or B-pictures which are inter-frame coded pictures (motion-compensated predictive coded pictures).

Accordingly, moving image data editing apparatus 1 may apply masking only to an intra-frame coded I-picture.

In this case, macroblock extracting unit 11 in moving image data editing apparatus 1 extracts the macroblocks located within mask region 82 only from the intra-frame coded I-picture.

Then, fixed pattern inserting unit 12 inserts the fixed pattern data into the positions within the I-picture in the data stream at which the macroblocks were originally located.

After that, macroblock inserting unit 13 inserts the extracted macroblocks into the user data region of the picture in the data stream.

Further, moving image data reproducing apparatus 2 may reconstruct the original image only for the intra-frame coded I-picture.

In this case, macroblock extracting unit 21 in moving image data reproducing apparatus 2 identifies which I-picture is processed by masking. Then, mask region 82 of the I-picture identified as being processed by masking is identified.

Next, macroblock extracting unit 21 extracts the macroblocks, originally located in mask region 82, from the user data area of the specified picture in the data stream.

Then, moving image reconstructing means 22 reconstructs the original moving image, i.e., the moving image before the masking was applied, by inserting the extracted original macroblocks so as to replace fixed pattern data 73 in the I-picture.

Conversely, when the moving image portion is specified as mask region 82, there are cases where the original image signal within mask region 82 is used for motion-compensated coding of its surrounding macroblocks. In such cases, when moving image data editing apparatus 1 replaces the macroblocks located in mask region 82 within the moving image data by the fixed pattern data, if the surrounding macroblocks are left unaltered, the image may be disrupted in these macroblocks.

Accordingly, when moving image data editing apparatus 1 replaces the macroblocks located in mask region 82 within the moving image data by the fixed pattern data, it is desirable to intra-frame code the surrounding macroblocks that use the image signals of the above macroblocks for motion-compensated coding. Analyzing/editing unit 16 used in such a moving image data editing apparatus 1 will be described with reference to FIG. 18.

FIG. 18 is a diagram showing the configuration of a second embodiment of analyzing/editing unit 16 shown in FIG. 8. Analyzing/editing unit 16 includes a surrounding block re-encoding unit 18 for intra-frame coding macroblocks located around the macroblocks of mask region 82.

Based on the position information of mask region 82 contained in mask information 62, surrounding block re-encoding unit 18 extracts from the input moving image data the macroblocks that used the macroblocks of mask region 82 for motion-compensated coding, and decodes the extracted macroblocks. Then, each of the decoded macroblocks is intra-frame coded and inserted back into its original position in the moving image data.

Alternatively, surrounding block re-encoding unit 18 extracts all the macroblocks located around the macroblocks of mask region 82 and suspected of using them for motion-compensated coding (for example, all the macroblocks located within the motion compensated range around mask region 82), and decodes the extracted macroblocks. Then, each of the decoded macroblocks is intra-frame coded and inserted back into its original position in the moving image data.

In this way, surrounding block re-encoding unit 18 intra-frame codes the macroblocks located around mask region 82, thereby preventing the image from being disrupted in these macroblocks when the macroblocks located within mask region 82 in the moving image data are replaced by the fixed pattern data.

The moving image data editing apparatus, moving image data reproducing apparatus, moving image data editing method, and moving image data reproducing method according to the present invention described above with reference to the preferred embodiments can be extensively used to implement techniques for applying a special visual effect to encoded moving image data and techniques for enabling/disabling such a special visual effect when reproducing the data. More particularly, the present invention can be applied to techniques for applying a special visual effect to moving image data encoded in accordance with a moving image encoding standard known as MPEG and for enabling/disabling such a special visual effect when reproducing the data.

In specific application examples, the moving image data editing apparatus, moving image data reproducing apparatus, moving image data editing method, and moving image data reproducing method of the present invention can be applied not only to the case where medical diagnostic images, etc., are used for other than diagnostic purposes, for example, for medical education purposes, as described above, but also to digital broadcasting services in which original images with no masking applied thereto are presented to specific viewers, but only limited moving images with masking applied thereto are presented to other general viewers.

While the present invention has been described with reference to the specific embodiments chosen for the purpose of illustration, it should be apparent to those skilled in the art that various modifications can be made therein without departing from the basic concept and scope of the invention, and it should be understood that such modifications also fall within the scope of the present invention.

What is claimed is:

1. A moving image data editing apparatus for applying masking to a portion of an image by editing moving image data in which each frame is divided into pixel blocks of a predetermined size and encoded on a pixel block basis, comprising:
   pixel block extracting means for extracting from an input data stream of said moving image data a pixel block that is located within a region to which said masking is to be applied;
   fixed pattern inserting means for inserting precoded fixed pattern data into a position in said input data stream at which said extracted pixel block was originally located; so as to superimpose said fixed pattern data in said input data stream at said region from which said extracted pixel block is extracted; and
   pixel block inserting means for inserting said extracted pixel block as user data into a user data area in said input data stream from which said extracted pixel blocked was extracted, wherein said user data area is different than a storage area provided to store video data,
   wherein said input data stream includes, for each frame, said user data area, and
   wherein said pixel block inserting means inserts said extracted pixel block into said user data area of the original frame from which said pixel block was extracted or into said user data area of a different frame than said original frame.

2. A moving image data editing apparatus as claimed in claim 1, wherein said fixed pattern data is intra-frame coded in advance.

3. A moving image data editing apparatus as claimed in claim 1, further comprising insert position information generating means for generating insert position information indicating the frame from which said pixel block was extracted and the frame into which said extracted pixel block is inserted.

4. A moving image data editing apparatus as claimed in claim 1, wherein said pixel block extracting means extracts said pixel block only from an intra-frame coded frame.

5. A moving image data editing apparatus as claimed in claim 1, wherein
   said moving image data is moving image data that conforms to MPEG, and
   said pixel block extracting means extracts a macroblock that is located within the region to which said masking is to be applied.

6. A moving image data editing apparatus as claimed in claim 5, wherein said pixel block extracting means inserts said extracted macroblock into said user data area of the original frame from which said macroblock was extracted or into said user data area of a different frame than said original frame.

7. A moving image data editing apparatus as claimed in claim 6, further comprising insert position information generating means for generating insert position information indicating the frame from which said macroblock was extracted and the frame into which said extracted macroblock is inserted.

8. A moving image data reproducing apparatus for reproducing moving image data in which each frame is divided into pixel blocks of a predetermined size and encoded on a pixel block basis, and in which masking is applied to a portion of an image, comprising:
   pixel block extracting means for extracting a pixel block inserted as user data from a user data area in an input data stream of said moving image data wherein said user data area is different than a storage area provided to store video data, and wherein said pixel block extracted from said user data area is a pixel block which was a part of moving image data ins aid input data stream; and
   moving image reconstructing means for reconstructing an original moving image, which is a moving image before said masking was applied, by inserting said extracted pixel block into said input data stream so as to replace data carried in a pixel block position located within a region to which said masking was applied,
   wherein said input data stream includes, for each frame, said user data area, and
   wherein said moving image reconstructing means inserts said extracted pixel block into the same frame from which said pixel block extracting means extracts said extracted pixel block or into a different frame than the frame from which said pixel block extracting means extracts said extracted pixel block.

9. A moving image data reproducing apparatus as claimed in claim 8, wherein said input data stream includes, for each frame, said user data area, and said extracted pixel block is inserted into said user data area of a different frame than the frame from which said pixel block was extracted, and wherein
   said moving image reconstructing means reconstructs said original moving image by inserting said pixel block extracted by said pixel block extracting means into the original frame from which said pixel block was extracted.

10. A moving image data reproducing apparatus as claimed in claim 9, wherein said moving image data reproducing apparatus further takes insert position information indicating the frame in which said pixel block is inserted as said user data and the frame from which said pixel block was extracted, and
   wherein based on said insert position information, said moving image reconstructing means inserts said extracted pixel block into the original frame from which said pixel block was extracted.

11. A moving image data reproducing apparatus as claimed in claim 8,
   wherein said moving image data is moving image data that conforms to MPEG, and
   wherein said moving image reconstructing means reconstructs said original moving image by inserting a macroblock extracted by said pixel block extracting means into a macroblock position located within the region to which said masking was applied in said input data stream.

12. A moving image data reproducing apparatus as claimed in claim 11,
   wherein said input data stream includes, for each frame, said user data area, and said extracted macroblock is inserted in said user data area of a different frame than the frame from which said macroblock was extracted, and
   wherein said moving image reconstructing means reconstructs said original moving image by inserting said macroblock extracted by said pixel block extracting means into the original frame from which said macroblock was extracted.

13. A moving image data reproducing apparatus as claimed in claim 12,
   wherein said moving image data reproducing apparatus further takes insert position information indicating the frame in which said macroblock is inserted as said user data and the frame from which said macroblock was extracted, and wherein based on said insert position information, said moving image reconstructing means inserts said extracted macroblock into the original frame from which said macroblock was extracted.

14. A moving image data editing method for applying masking to a portion of an image by editing moving image data in which each frame is divided into pixel blocks of a predetermined size and encoded on a pixel block basis, comprising:

extracting from an input data stream of said moving image data a pixel block that is located within a region to which said masking is to be applied;

inserting precoded fixed pattern data into a position in said input data stream at which said extracted pixel block was originally located, as to superimpose said fixed pattern data in said input data stream at said region from which said extracted pixel block is extracted; and inserting said extracted pixel block as user data into a user data area in said input data stream from which said extracted pixel block was extracted, wherein said user data area is different than a storage area provided to store video data, wherein said input data stream includes, for each frame, said user data area, and wherein said inserting said extracted pixel block comprises inserting said extracted pixel block into said user data area of the original frame from which said pixel block was extracted or into said user data area of a different frame than said original frame.

15. A moving image data editing method as claimed in claim 14, wherein said fixed pattern data is intra-frame coded in advance.

16. A moving image data editing method as claimed in claim 15, further comprising generating insert position information indicating the frame from which said pixel block was extracted and the frame into which said extracted pixel block is inserted.

17. A moving image data editing method as claimed in claim 14, wherein said pixel block is extracted only from an intra-frame coded frame.

18. A moving image data editing method as claimed in claim 14, wherein
said moving image data is moving image data that conforms to MPEG, and
a macroblock that is located within the region to which said masking is to be applied is extracted.

19. A moving image data editing method as claimed in claim 18, wherein said extracted macroblock is inserted into said user data area of the original frame from which said macroblock was extracted or of a different frame than said original frame.

20. A moving image data editing method as claimed in claim 19, further comprising generating insert position information indicating the frame from which said macroblock was extracted and the frame into which said extracted macroblock is inserted.

21. A moving image data reproducing method for reproducing moving image data in which each frame is divided into pixel blocks of a predetermined size and encoded on a pixel block basis, and in which masking is applied to a portion of an image, comprising:

extracting a pixel block inserted as user data from a user data area in an input data stream of said moving image data, wherein said user data area is different than a storage area provided to store video data, and wherein said pixel block extracted from said user data area is a pixel block which was a part of moving image data in said input data stream; and reconstructing an original moving image, which is a moving image before said masking was applied, by inserting said extracted pixel block into said data stream so as to replace data carried in a pixel block position located within a region to which said masking was applied, wherein said input data stream includes, for each frame, said user data area, and wherein said reconstructing an original moving image comprises inserting said extracted pixel block into the same frame including said user data area from which said pixel block is extracted or into a different frame than the frame including said user data area from which said pixel block is extracted.

22. A moving image data reproducing method as claimed in claim 21, wherein said input data stream includes, for each frame, said user data area in which said user data is to be inserted, and said extracted pixel block is inserted in said user data area of a different frame than the frame from which said pixel block was extracted, and wherein said original moving image is reconstructed by inserting said pixel block extracted by said pixel block extracting means into the original frame from which said pixel block was extracted.

23. A moving image data reproducing method as claimed in claim 22, further comprising inputting insert position information indicating the frame in which said pixel block is inserted as said user data and the frame from which said pixel block was extracted, and wherein based on said insert position information, said extracted pixel block is inserted into the original frame from which said pixel block was extracted.

24. A moving image data reproducing method as claimed in claim 21, wherein said moving image data is moving image data that conforms to MPEG, and wherein said original moving image is reconstructed by inserting said macroblock extracted by said pixel block extracting means into a macroblock position located within the region to which said masking was applied in said input stream.

25. A moving image data reproducing method as claimed in claim 24, wherein said data input stream includes, for each frame, said user data area in which said user data is to be inserted, and said extracted macroblock is inserted in said user data area of a different frame than the frame from which said macroblock was extracted, and wherein said original moving image is reconstructed by inserting said macroblock extracted by said pixel block extracting means into the original frame from which said macroblock was extracted.

26. A moving image data reproducing method as claimed in claim 25, further comprising inputting insert position information indicating the frame in which said macroblock is inserted as said user data and the frame from which said macroblock was extracted, and wherein based on said insert position information, said extracted macroblock is inserted into the original frame from which said macroblock was extracted.

* * * * *

UNITED STATES PATENT AND TRADEMARK OFFICE
CERTIFICATE OF CORRECTION

PATENT NO. : 8,532,468 B2
APPLICATION NO. : 11/896905
DATED : September 10, 2013
INVENTOR(S) : Tsutomu Togo et al.

Page 1 of 1

It is certified that error appears in the above-identified patent and that said Letters Patent is hereby corrected as shown below:

In the Claims

In Column 17, Line 35, In Claim 16, delete "claim 15," and insert -- claim 14, --, therefor.

Signed and Sealed this
Twenty-fourth Day of December, 2013

Margaret A. Focarino
*Commissioner for Patents of the United States Patent and Trademark Office*